United States Patent
Hollis

(10) Patent No.: US 10,051,347 B2
(45) Date of Patent: Aug. 14, 2018

(54) DISPLACEMENT SENSOR

(71) Applicant: Stephen Hollis, Seattle, WA (US)

(72) Inventor: Stephen Hollis, Seattle, WA (US)

(73) Assignee: Stephen Hollis, Seattle, WA (US)

(*) Notice: Subject to any disclaimer, the term of this patent is extended or adjusted under 35 U.S.C. 154(b) by 0 days.

(21) Appl. No.: 14/908,379

(22) PCT Filed: Aug. 1, 2014

(86) PCT No.: PCT/US2014/049446
§ 371 (c)(1),
(2) Date: Jan. 28, 2016

(87) PCT Pub. No.: WO2015/017805
PCT Pub. Date: Feb. 5, 2015

(65) Prior Publication Data
US 2016/0165323 A1    Jun. 9, 2016

Related U.S. Application Data

(60) Provisional application No. 61/861,418, filed on Aug. 2, 2013.

(51) Int. Cl.
*G08B 25/10*  (2006.01)
*G07C 5/08*  (2006.01)
(Continued)

(52) U.S. Cl.
CPC .............. *H04Q 9/00* (2013.01); *G08B 13/08* (2013.01); *G08B 25/10* (2013.01); *H04Q 2209/43* (2013.01); *H04Q 2209/823* (2013.01)

(58) Field of Classification Search
CPC .................. G08B 21/00; B60W 2520/105
See application file for complete search history.

(56) References Cited

U.S. PATENT DOCUMENTS 6,249,246 B1   6/2001  Bode et al.
6,310,549 B1 * 10/2001  Loftin ............... G08B 13/08
                                                 324/207.21
(Continued)

FOREIGN PATENT DOCUMENTS

WO    WO 2012/058770 A1    5/2012

OTHER PUBLICATIONS

International Search Report for PCT/US2014/049446 dated Nov. 24, 2014 (8 pages).
(Continued)

*Primary Examiner* — Joseph Feild
*Assistant Examiner* — Pameshanand Mahase
(74) *Attorney, Agent, or Firm* — K&L Gates LLP

(57) ABSTRACT

A unitary displacement sensor includes a circuit, a first device for measuring acceleration, a second device for measuring a magnetic field, a wireless communications module, and a power source coupled to the circuit, the first device, the second device, and wireless communications module such that the circuit is configured to cause the power source to activate the wireless communications module and the second device when a level of acceleration measured by the first device meets or exceeds a predefined threshold level of acceleration and the wireless communications module is configured to transmit a measurement by the second device of the magnetic field.

21 Claims, 15 Drawing Sheets

(51) Int. Cl.
  *G08C 19/02* (2006.01)
  *G08C 17/02* (2006.01)
  *H04Q 9/00* (2006.01)
  *G08B 13/08* (2006.01)

(56) References Cited

U.S. PATENT DOCUMENTS

| | | |
|---|---|---|
| 6,846,802 B2 | 3/2005 | Smith et al. |
| 7,089,099 B2 | 8/2006 | Shostak et al. |
| 8,094,018 B2 | 1/2012 | Chang |
| 8,912,893 B2 | 12/2014 | Bullmore |
| 9,280,886 B2 | 3/2016 | Bullmore |
| 2002/0075163 A1 | 6/2002 | Smith et al. |
| 2003/0071739 A1* | 4/2003 | Addy ............... G08B 13/08 340/686.1 |
| 2006/0025897 A1* | 2/2006 | Shostak ............ B60C 23/005 701/1 |
| 2009/0219166 A1* | 9/2009 | MacFarlane ...... H04M 1/72566 340/691.4 |
| 2009/0223265 A1 | 9/2009 | Chang |
| 2013/0181839 A1 | 7/2013 | Cao |
| 2013/0278377 A1* | 10/2013 | Slupsky ............. G01B 21/32 340/5.1 |
| 2013/0335219 A1* | 12/2013 | Malkowski ........ G08B 13/22 340/539.22 |

OTHER PUBLICATIONS

Written Opinion for PCT/US2014/049446 dated Nov. 24, 2014 (5 pages).

* cited by examiner

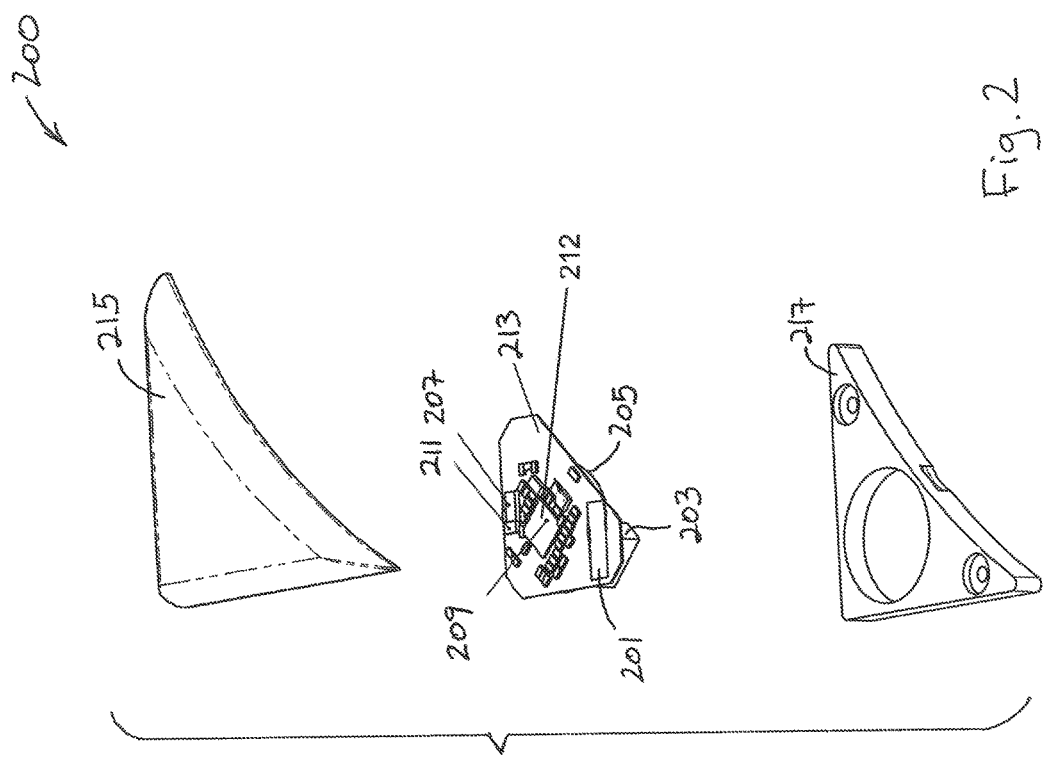

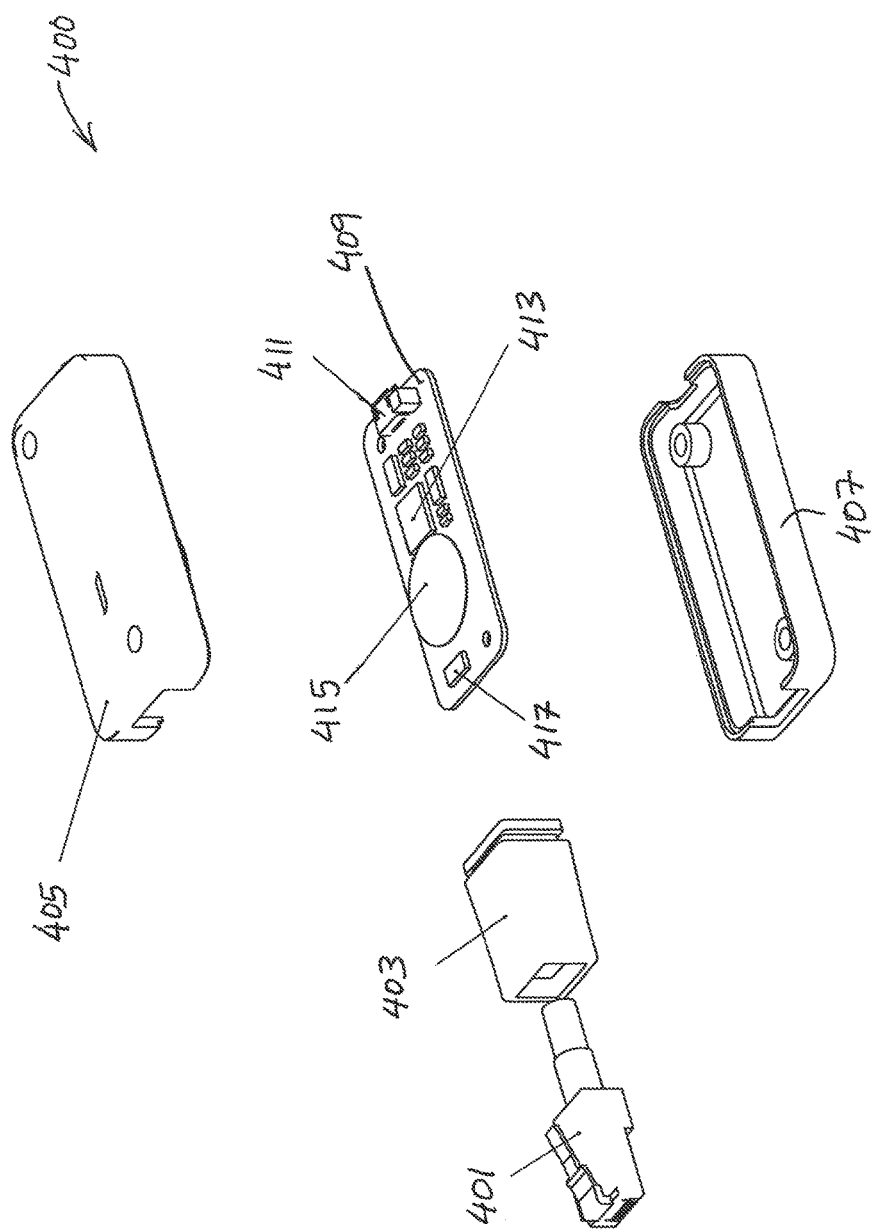

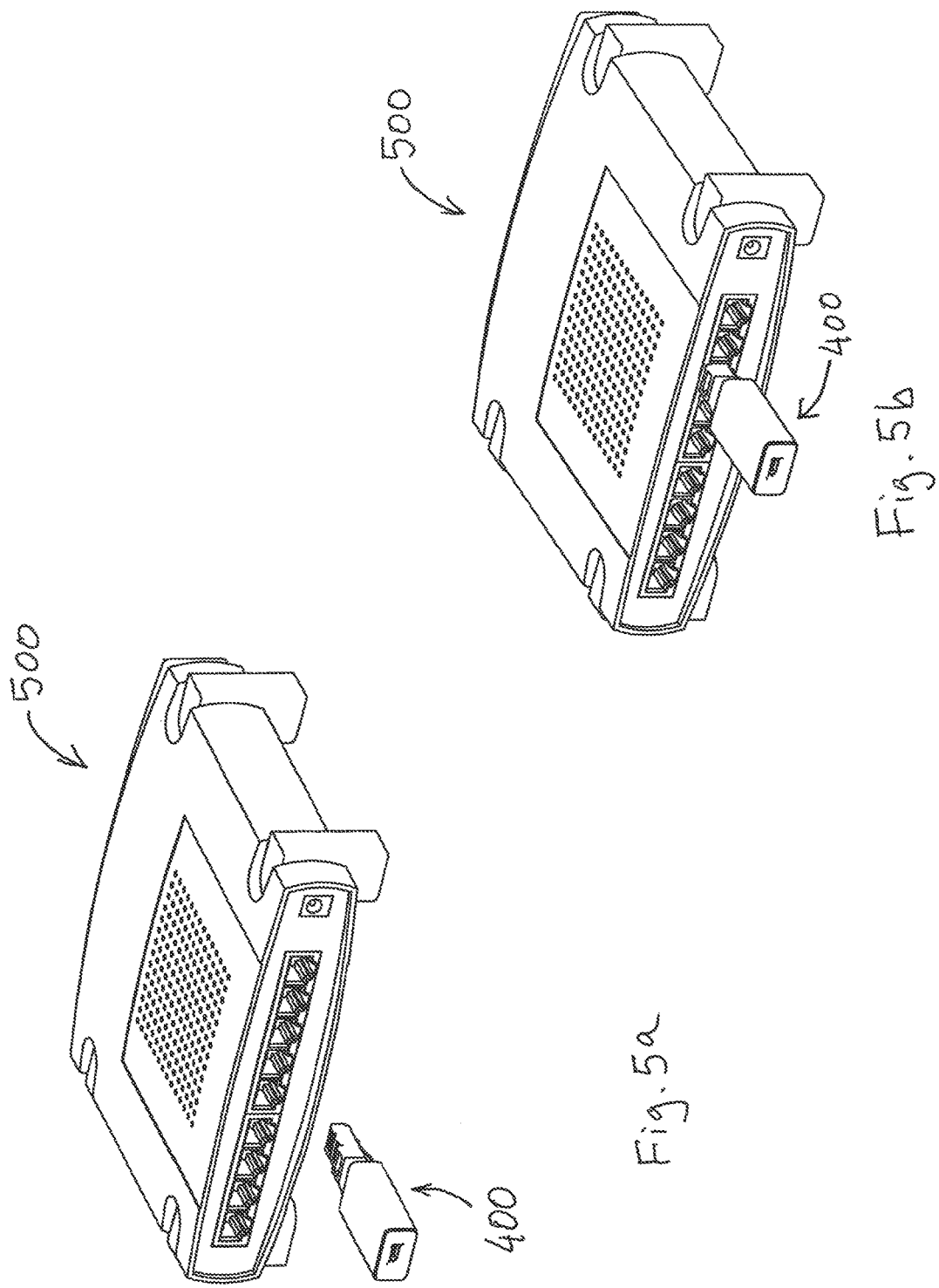

DISPLACEMENT SENSOR

CROSS REFERENCE TO RELATED APPLICATIONS

This application is a U.S. national stage application, filed under 35 U.S.C. § 371, of PCT/US2014/049446, which was filed on Aug. 1, 2014, and which claims the benefit of U.S. Provisional Patent Application Ser. No. 61/861,418 entitled DISPLACEMENT SENSOR filed on Aug. 2, 2013, the contents of which are incorporated by reference.

TECHNICAL FIELD

The present disclosure is directed to the technical field of displacement sensors. More particularly, the present disclosure is directed to the technical field of detecting the motion or displacement of a specific object that a sensor is attached to.

BACKGROUND

Conventional displacement sensors, such as those included in home security systems, are comprised of two components, one of which is attached to a door or window frame, and the other attached to the door or window itself. Conventional sensors generally employ a reed switch, or other magnetic field sensor, and a magnet arrangement. One component is attached to a moving element (e.g., door or window) and one component is attached to a stationary element (e.g., door or window frame). The two components are attached such that they align with each other and when properly aligned they are capable of completing an electrical circuit. One of the components contains a battery which maintains this electrical circuit, and once the door or window is opened, the alignment of the two components is disrupted and the electrical circuit is broken. One of the components then emits a signal to a base station within the home that the door or window has been displaced. This displacement detection system creates a number of challenges/inconveniences for the user:

1. Size—The components include at least one magnet, at least one magnetic filed sensor, a sufficiently large battery, and plastic enclosures to properly house these larger, heavier components. This contributes to the cost of shipping and packaging the parts to the customer.
2. Appearance—This approach results in large and unsightly parts attached to doors and windows throughout a house.
3. Installation—The two components must be properly aligned and carefully secured to both the door/window and respective frames.
4. Cost—each entry point (door or window) requires two separate components, one containing a magnet, the other containing reed switch or other magnetic sensor, and a sufficiently large battery to maintain an electrical current.

SUMMARY

The present disclosure provides a one-piece displacement sensor (no pairing required) comprising a magnetometer, an accelerometer, a battery and a component for wireless transmission. The magnetometer is used to detect any change in orientation (such as a swinging door, opening window, sliding door or window, and the like), by using its ability to detect true north, or any other change in the surrounding magnetic field (e.g., generated by the sensor moving relative to any adjacent ferrous metal). This enables the sensor to employ any adjacent ferrous metal as a reference point for any displacement, as opposed to having to be paired with an accompanying component, such as a magnet, to generate a local magnetic field.

The accelerometer is employed to reduce power consumption by utilizing an interrupt function that only activates the sensor once it experiences a predefined level of acceleration, at which time the accelerometer will enable the magnetometer and wireless component to power up and draw current. This significantly reduces power consumption over the life of the sensor, allowing the components within the sensor to lie dormant until the sensor experiences motion, thus reducing significantly the size and cost of the battery.

An application of this displacement sensor, among other applications, can be as part of a home security system. In such an application the displacement sensor, or Tag, is combined with a FOB that is plugged into a user's router. One example of a FOB is a security token in a small hardware form factor with built-in authentication mechanisms. The FOB is configured to receive information wirelessly transmitted by the Tag and to transmit data to at least one centralized server which processes the information and determines whether the user should be alerted. When the user is alerted, the servers also will instruct the FOB to emit an audible alarm. The present disclosure also contemplates embodiments employing a FOB configured to receive information transmitted by the Tag over a wired communication link. And well as embodiments in which the communication between the FOB and the Tag are implemented using a combination of wireless and wired communication links.

As part of this security system, the user will be able to establish a Security Circle, or a list of the user's family, friends and neighbors, which can be pre-populated by the user. When an alert is received via the user's smartphone application (app), the user will be provided the option to call the police, or to forward the alert to their Security Circle. A pre-populated message to forward to the Security Circle will be presented, which can be edited, which will include a brief description of the event, including the entry point involved. Once the message is sent, a running dialogue with the Security Circle will be displayed.

When a user becomes a subscriber of this security system, they will become a member of a network that includes other users of the product. The user will have the ability to see, on an anonymous basis, how many users are within various distances from the user's residence, including users who are not part of the user's Security Circle. Users will be able to communicate with each other on an anonymous basis, and will be provided options to introduce themselves to particular users. Also, when a user populates their Security Circle, each member of the Security Circle will be sent an email offering them to become a member of the network. The user will also have the option to forward an alert to this network of anonymous users that are outside their Security Circle.

The present disclosure is intended to address many of the shortcomings of traditional displacement sensors:

1. Size—In one embodiment, the sensor is about ¼" thick and has a triangular shape with about 1¾" sides. Thus the sensor is much smaller and can be inventoried and shipped much more cost effectively. In various embodiments, the unitary displacement sensor may be configured in a variety of form factors. For example, in addition to the triangular shape, the unitary displacement sensor may have a square, rectangular, circular, oval, rhomboidal, irregular, or any suitable form factor that will enable its application to an entry point such as a door or window, among others. The form factor may have any suitable dimensions with sides ranging from about ½" to about 6" and a thickness in the range of about ⅛" to about ½".

2. Appearance—Because of the small battery and no magnets, a flat sensor according to the present disclosure can be easily installed less obtrusively in a corner of a door or window.

3. Installation—In one embodiment, the sensor has no pairing magnet or other element and thus no alignment is required, and with a reusable adhesive backing, hook and loop fastening, or other application mechanism, the sensor can be easily installed, removed and reinstalled in case that the sensor needs to be relocated, for example based on the user moving to new location.

4. Performance—In one embodiment, the sensor can effectively discern between strong vibrations (for example, in the case of strong winds or when someone is banging on the door) and actual displacement.

5. Cost—In the case of a home security application, only one component is required per entry point, no bulky magnets are required, and a much smaller battery can be used, as a current is not constantly maintained and is instead only required when movement is initiated. With the smaller size and weight, a lighter and less expensive casing or housing can be used.

BRIEF DESCRIPTION OF THE DRAWINGS

The novel features of the various embodiments are set forth with particularity in the appended claims. The various embodiments, however, both as to organization and methods of operation, together with the advantages thereof, may be understood by reference to the following description taken in conjunction with the accompanying drawings as follows.

FIG. 2 is a disassembled view of a unitary displacement sensor with a casing according to one embodiment of the present disclosure.

FIG. 4 is a disassembled view of a FOB according to one embodiment of the present disclosure.

FIG. 5a is a view of the FOB of FIG. 4 being connected to a router.

FIG. 5b is a view of the FOB of FIG. 4 connected to a router.

DETAILED DESCRIPTION

Various embodiments are described to provide an overall understanding of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting embodiments and that the scope of the various embodiments is defined solely by the claims. The features illustrated or described in connection with one embodiment may be combined, in whole or in part, with the features of other embodiments. Such modifications and variations are intended to be included within the scope of the claims.

Figure 1A:
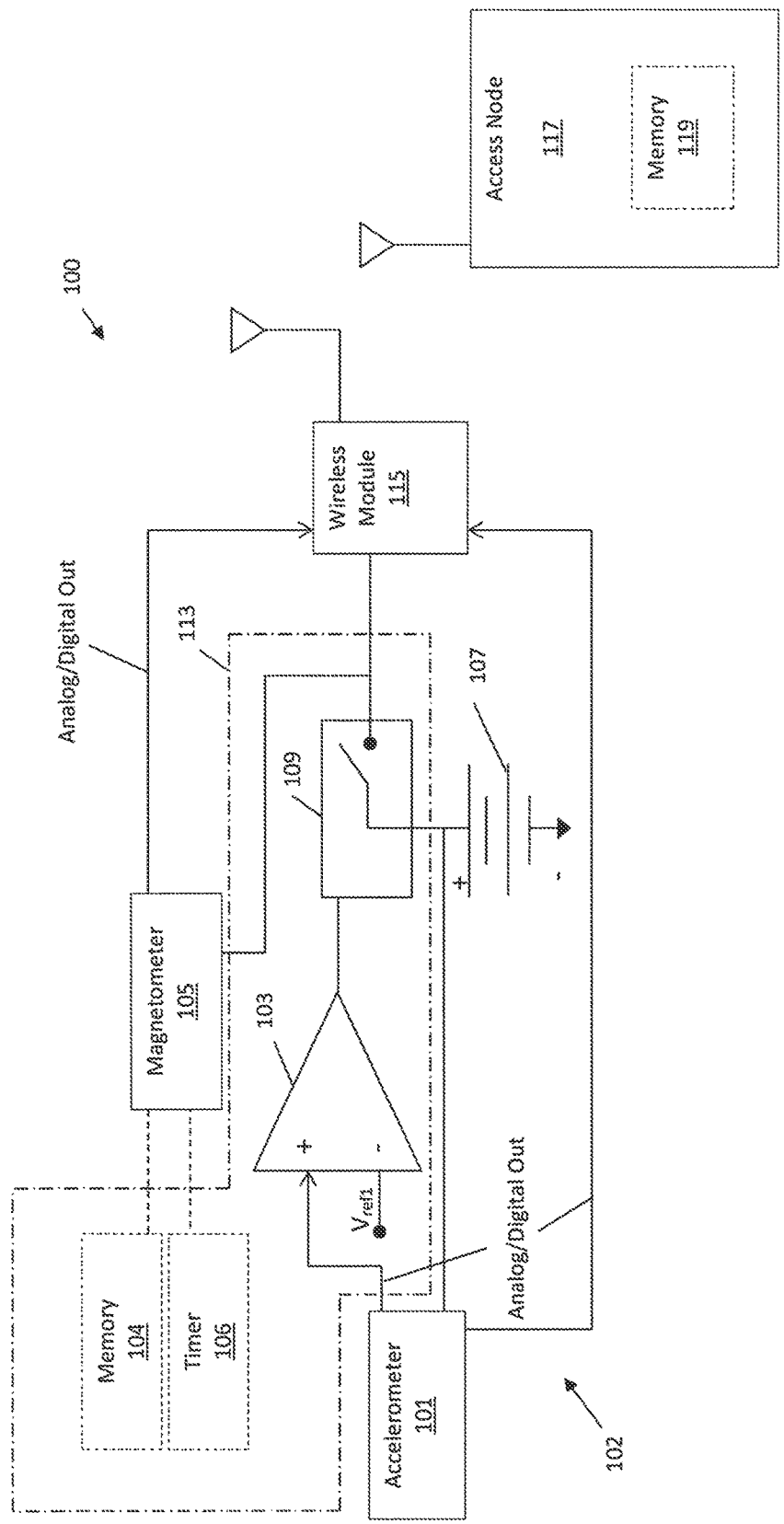
FIG. 1a is a schematic diagram of a system for detecting displacement of a sensor according to one embodiment of the present disclosure.
Figure 1B:
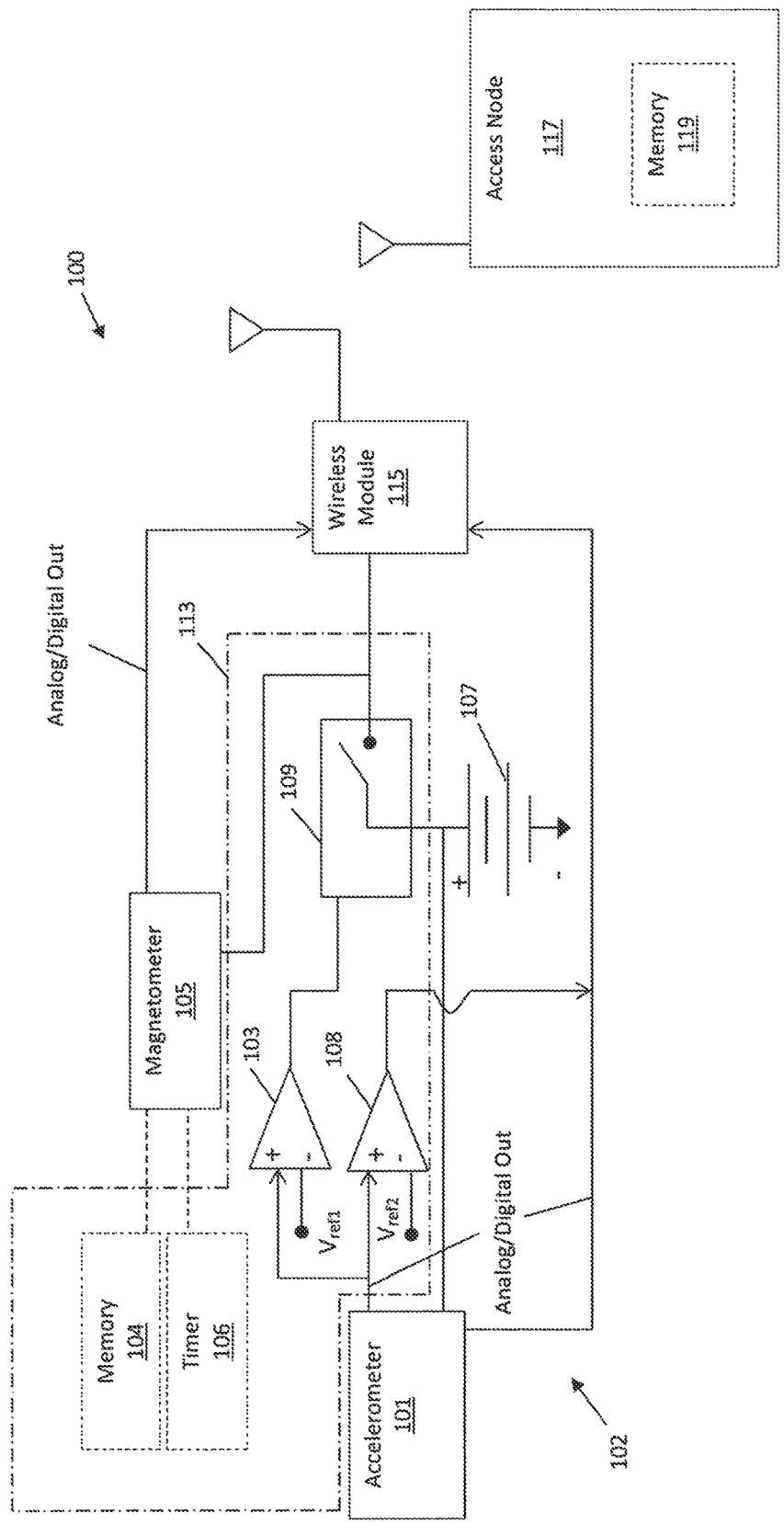
FIG. 1b is a schematic diagram of a system for detecting displacement of a sensor according to one embodiment of the present disclosure.
Figure 1C:
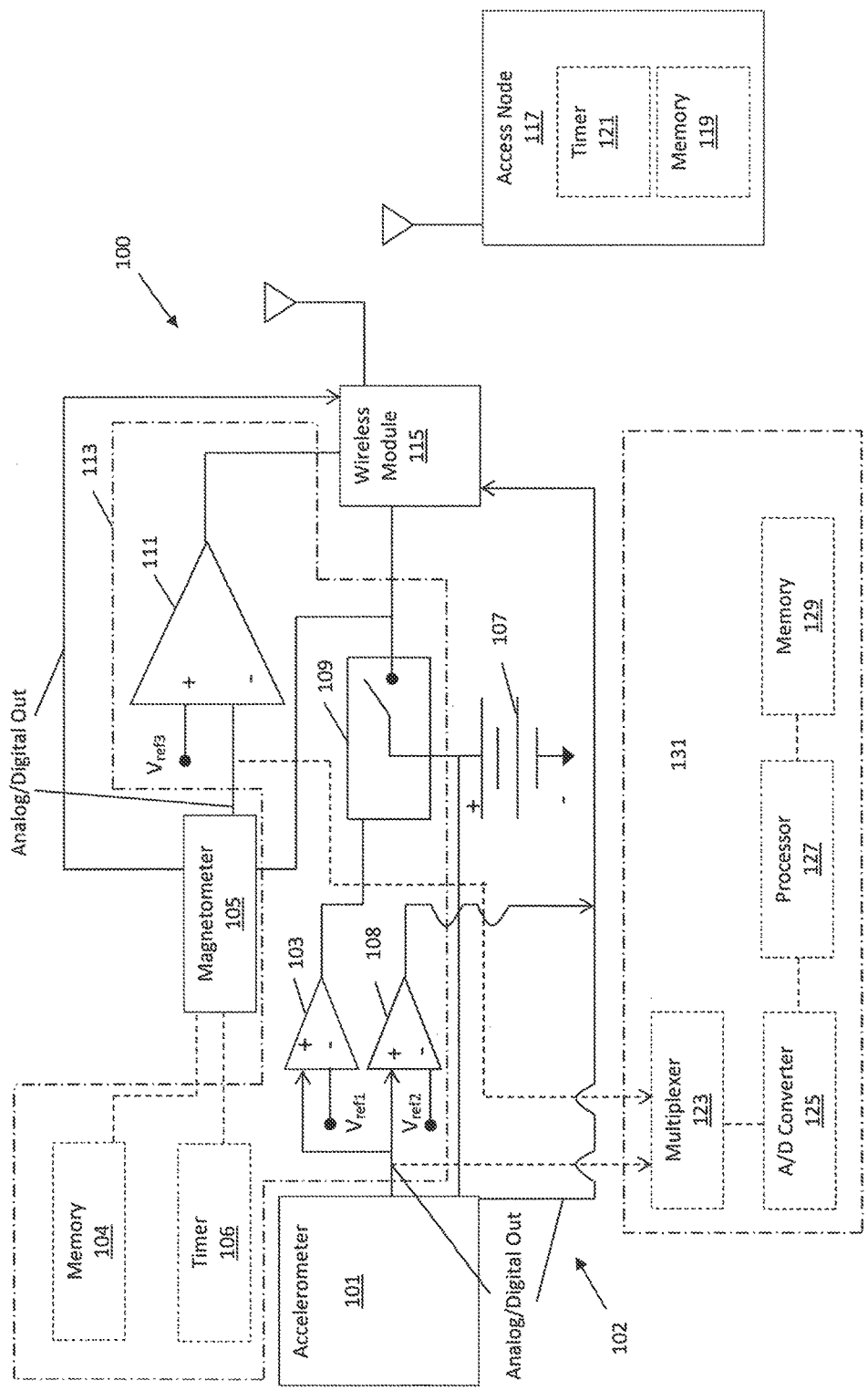
FIG. 1c is a schematic diagram of a system for detecting displacement of a sensor according to one embodiment of the present disclosure.

With regard to FIGS. 1a-1c embodiments of a system 100 for detecting displacement of sensor are disclosed. The same reference numbers are used to indicate elements and components that function the same way in various embodiments. As seen in FIG. 1a, in one embodiment, a unitary displacement sensor 102 comprises a circuit 113, a first device for measuring acceleration such as an accelerometer 101, a second device for measuring a magnetic field such as a magnetometer 105, a wireless communications module 115, and a power source 107 coupled to the circuit 113, the accelerometer 101, the magnetometer 105, and the wireless communications module 115. According to the embodiment shown in FIG. 1, the accelerometer 101 may be an accelerometer and the magnetometer 105 may be a magnetometer. The circuit 113 is configured to cause the power source 107 to activate the wireless communications module 115 and the magnetometer 105 when a level of acceleration measured by the accelerometer 101 meets or exceeds a predefined threshold level of acceleration.

In one embodiment, the wireless communications module 115 is configured to transmit data regarding a measurement of the magnetic field by the magnetometer 105. The data regarding the measurement of the magnetic field may comprise an actual measurement of the magnetic field, a relative measurement of the magnetic field, a level of change of the magnetic field from a reference magnetic field measurement, an indication that the level of change of the magnetic field from a reference magnetic field is within predefined values or amounts, any other information pertinent to the magnetic field, or any combination of these. The data regarding the measurement may be transmitted to the access node 117 which transmits this information to a monitoring and control system (not shown).

In one embodiment, the monitoring and control system compares the data regarding the measurement of the magnetic field by the magnetometer 105 to a predefined threshold level of change of the magnetic field and when a level of change in the magnetic field measured by the magnetometer 105 meets or exceeds the predefined threshold level of change of the magnetic field, the monitoring and control system enters an alarm state. This may include the monitoring and control system transmitting an alarm signal to the access node 117 and/or the sensor 102. Further, the monitoring and control system may send alerts regarding an intrusion event to a user or to entities known to the user regarding details associated with the intrusion event and alarm state.

Figure 10:
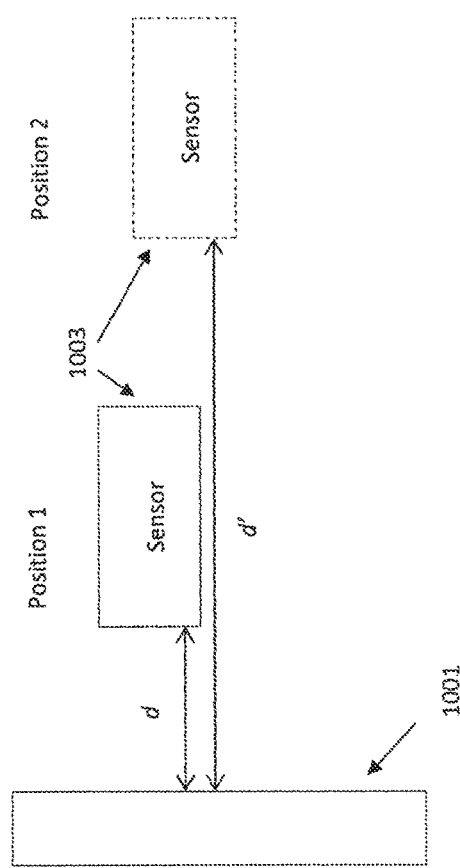
FIG. 10 is a view of a magnetic field sensor in relationship to a ferrous element.
Figure 11:
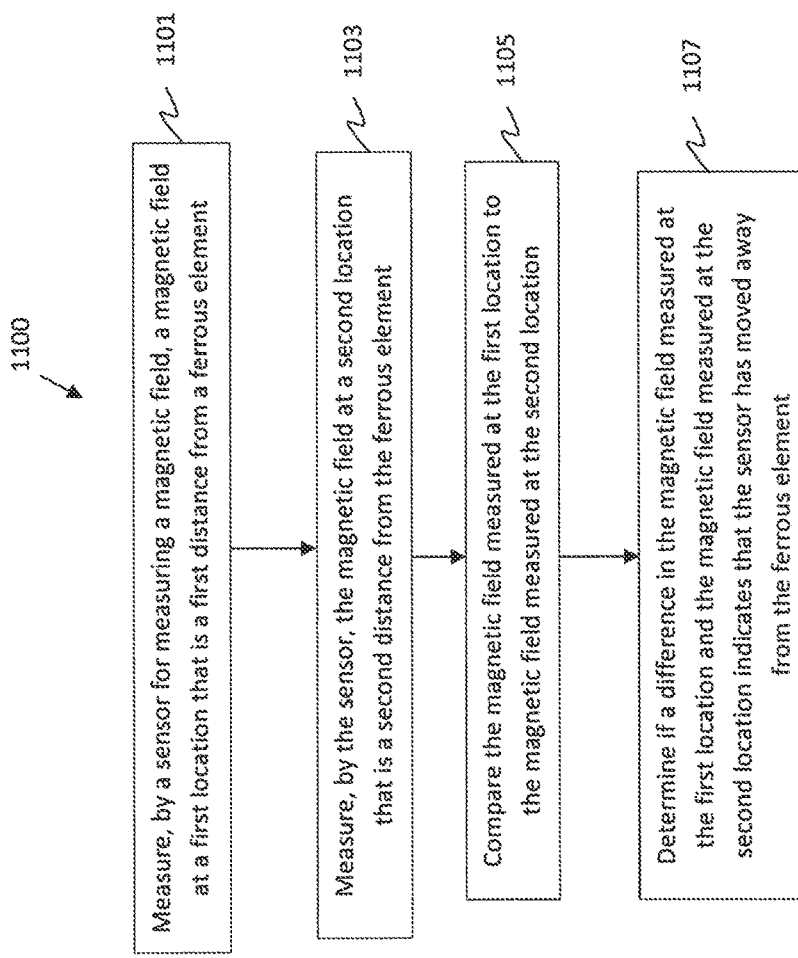
FIG. 11 is a logic diagram illustrating of one embodiment of a method for detecting a displacement sensor in a system as described herein.

In one embodiment, the magnetometer 105 for measuring a magnetic field may be implemented such that it measures the earth's magnetic field and the disruptions or alterations to that field caused by a proximally located ferrous element (or any ferromagnetic element that can distort local magnetic lines of flux). The ferrous element may be employed as a component of infrastructure in proximity to where the unitary displacement sensor 102 is located. For example, with reference now to the embodiments of a sensor for measuring a magnetic field 1003 shown in FIG. 10 and the method 1100 of FIG. 11, a sensor 1003 for measuring a magnetic field is configured to measure 1101 a magnetic field when it is at a first location (position 1) located at a distance "d" from a ferrous element 1001. The sensor 1003 is configured to measure 1101 a value of the magnetic field at the first location (position 1) 1101. When the sensor 1003 is moved to a second location (position 2) at a distance "d'" from ferrous element 1001 it will measure 1103 a different value of the magnetic field at the second location (position 2). The magnetic field measurements at the first location (position 1) and the second location (position 2) are compared 1105 and it is determined 1107 if the difference in these measurements indicates that the sensor 1003 has moved away from the ferrous element 1001. The determination 1107 can be performed, for example, based on known values for the magnetic field at the reference locations, position 1 and position 2, or simply based on an amount of change in the value of the magnetic field based on the distance d to d'.

Figure 6B:
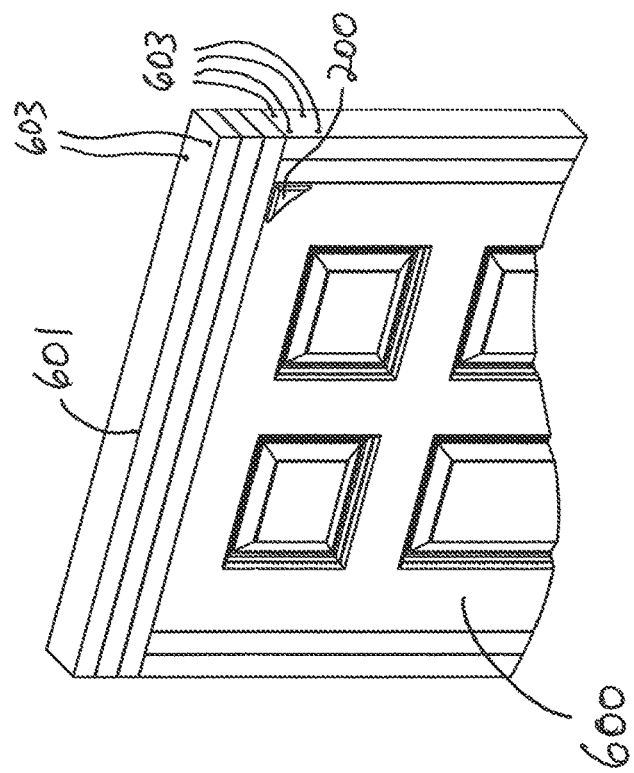
FIG. 6b is a view of the Tag of FIG. 6a deployed on a door.
Figure 6A:
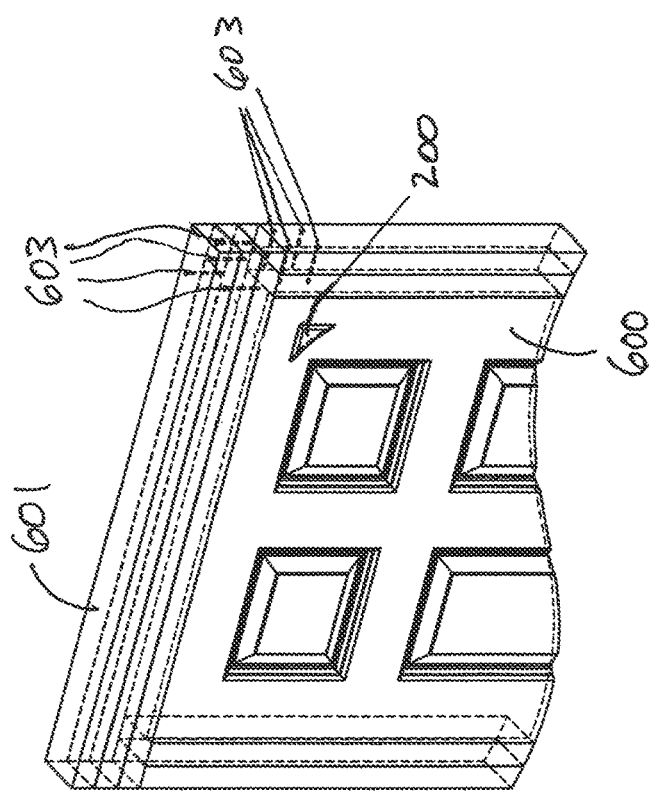
FIG. 6a is a view of a Tag according to one embodiment of the present disclosure being deployed on a door.
Figure 7B:
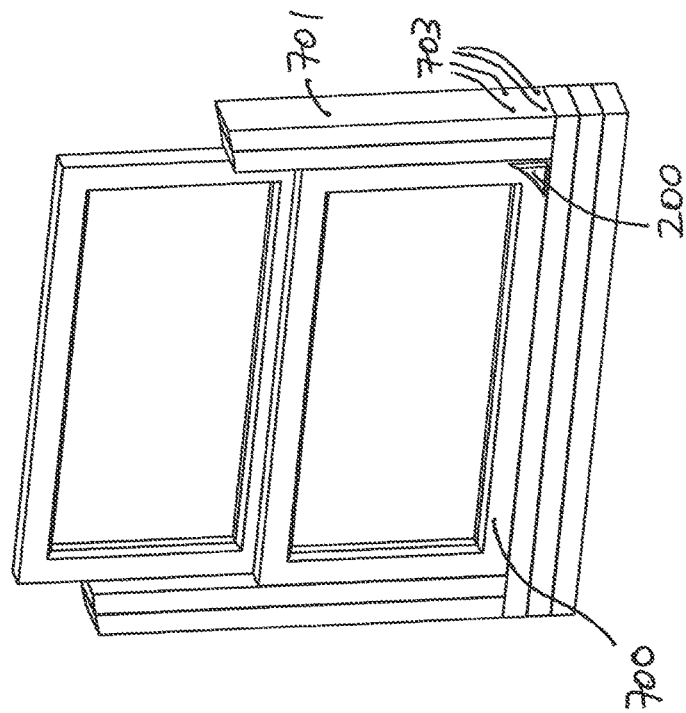
FIG. 7b is a view of the Tag of FIG. 7a deployed on a window.
Figure 7A:
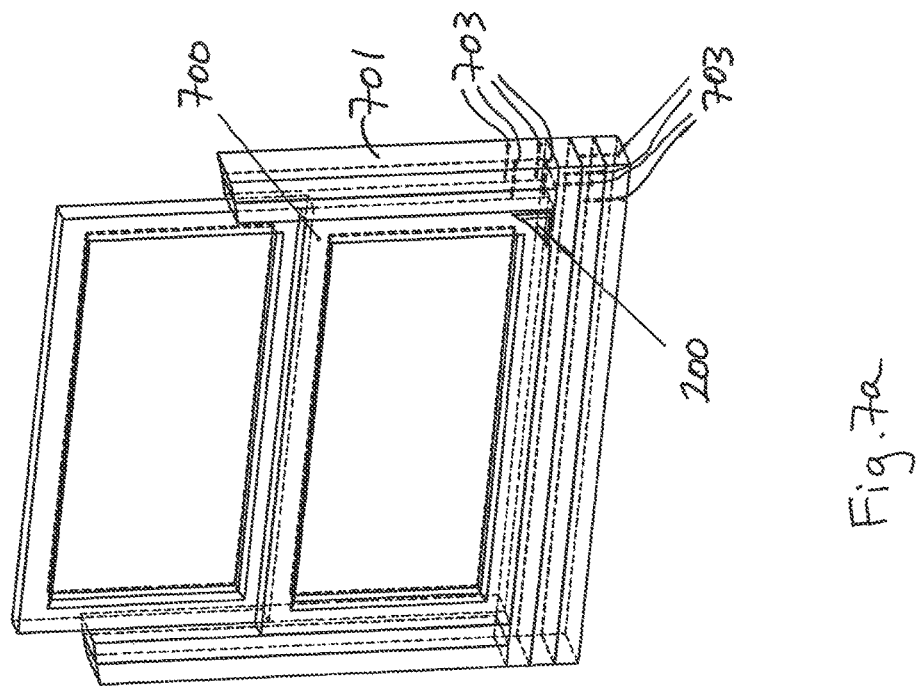
FIG. 7a is a view of a Tag according to one embodiment of the present disclosure being deployed on a window.

As a further example, with reference now to the embodiment shown in FIGS. 6a, 6b, 7a, 7b, a unitary displacement sensor 200 is shown attached to the upper corner of a door 600 as shown in FIGS. 6a, 6b, and additionally, as shown in FIGS. 7a, 7b, the unitary displacement sensor 200 may be attached to the upper corner of a window 700. Based on the proximity of the sensor 200 to ferrous elements 603, 703 holding the door frame 601 or the window frame 701, respectively, the sensor 200 can detect the magnetic field with reference to the ferrous element 603, 703. As the door 600 or window 700 is moved, the sensor will detect a change in the magnetic filed and is able to transmit a signal accordingly. A ferrous element 603, 703 may include for example, a nail, a screw, bracket or other fastener or securing device that is used to secure a door frame, a window, or other entry point to a structure and that exhibits magnetic properties but is not necessarily magnetized itself. In various embodiments, the sensor 200 may be located between about 0.5" and 6" away from a ferrous element 603, 703 with a nominal distance of about 1.5".

With reference now back to FIGS. 1a-1c, the magnetometer 105 may be any device that responds to or measures a magnetic field and is sized appropriately to be attached at location on an entry point to a structure. Accordingly the magnetometer 105 may be any form of magnetometer, including for example, a Hall Effect magnetometer, such as single axis, double axis, or triple axis magnetometer. The most common magnetic sensing devices are solid-state Hall Effect sensors that produce a voltage proportional to the applied magnetic field and also sense polarity. Other types of magnetometers include, without limitation, magnetoresistive devices that are made of thin strips of permalloy (NiFe magnetic film) whose electrical resistance varies with a change in magnetic field. They have a well-defined axis of sensitivity, can be produced in 3D versions and can be mass-produced as an integrated circuit. They have a response time of less than 1 microsecond and can be sampled up to 1,000 times/second, for example. They also can be used in compasses that read within 1°, for which the underlying sensor must reliably resolve 0.1°, for example. In one embodiment, the magnetometer may be implemented using an HMC58833L 3-Axis Digital Compass IC available from Honeywell International Inc.

Similarly, the accelerometer 101 may be any device that measures acceleration and is sized appropriately to be attached at location on an entry point to a structure. Accordingly the accelerometer 101 may be any form of accelerometer, including for example, single, double, or triple axis accelerometers. In accordance with one embodiment, the accelerometer 101 may comprise at least one of a microelectromechanical systems (MEMS) triple axis accelerometer device, among others, without limitation. In various embodiments, as described in more detail below in connection with FIG. 1d, a magnetometer sensor may be provided in a single integrated circuit package in combination with an accelerometer sensor including the necessary analog/digital electronic circuitry to enable their operation. One example of such integrated circuit package is the FXOS8700CQ digital sensor from Freescale Semiconductor, which provides a 3D accelerometer (±2 g/±4 g/±8 g) and a 3D magnetometer sensor in one integrated circuit package. In other embodiments, the accelerometer 101 may be the MMA8451Q (±2 g/±4 g/±8 g) low g, 14-bit digital accelerometer and the magnetometer 105 may be the MAG3110 Xtrinsic high accuracy 3D magnetometer, both also from Freescale Semiconductor. In one embodiment, the accelerometer 101 and the magnetometer 105 may be combined in a single integrated circuit device, such as, for example, the FXOS8700CQR1-1, 6-axis Xtrinsic sensor from Freescale Semiconductor. Outputs from the accelerometer 101 and magnetometer 105 may be analog or digital as indicated on the output lines in FIGS. 1a-1c. Further, in other embodiments, the accelerometer 101 and the magnetometer 105, and any other necessary components, may include signal processing components within their structure or signal processing may be implemented by additional hardware and/or software devices remote from the accelerometer 101 and the magnetometer 105, or other components.

In the embodiments shown in FIGS. 1a-1c, the circuit 113 comprises a first comparator 103 with a first reference ($V_{ref1}$) point coupled to the accelerometer 101. As shown, an electronically operated switch 109 is coupled to the output of the first comparator 103 such that when the accelerometer 101 meets or exceeds a predefined threshold level of acceleration, the switch 109 will close and to couple the power source 109, which may be a battery or other appropriate device, to the magnetometer 105 and the wireless communications module 115 to supply power thereto. As such, the power source 109 is conserved and current flows only in instances where the sensor 102 is moving at a predetermined rate. In one embodiment, the magnetometer 105 is also configured to activate periodically, for example in 10-15 second intervals, such that the sensor 102 is configured to determine when the magnetic field has changed. This configuration may be implemented to address a case where a very slow opening does not trigger or set off the accelerometer 101.

Additionally, as shown in FIGS. 1a-1c, the magnetometer 105 may be coupled to a timer 106 that is configured to cause the magnetometer 105 to provide magnetic field measurement data regarding according to the timer 106. In one embodiment, the timer 106 is configured to cause the magnetometer 105 to provide a periodic measurement of the magnetic field, for example, every 10-15 seconds. The measurement from the magnetometer 105 may be stored in memory 104 and/or it may be communicated to the wireless module 115 so that the wireless module 115 can transmit the magnetic field measurement data to the access node 117, where the access node 117 may be configured to store the magnetic field measurement data in its memory 119.

Further, as shown in FIGS. 1b and 1c, instead of or in addition to the timer 106 provided in the unitary displacement sensor 102, the access node 117 may include a timer 121. The access node 117 is configured to transmit a signal that is received by the sensor 102 to cause the magnetometer 105 to provide a measurement of the magnetic field according to the timer 121. The sensor 102 may transmit a signal comprising the measurement of the magnetic field to the access node 117 that the access node 117 stores in memory 119. The measurement provided based on the timer 106, 121 is stored such that when there is no change in position the sensor 102 (i.e., based on a lack of activation of or measurement from the accelerometer 101) for some time, the system 100 is configured to detect a position of the sensor 102 with regard to the stored value of the magnetic field. Accordingly, a user seeking to activate the system 100 may be alerted to the situation where an entry point is in an open position when the system 100 is armed. In one aspect, the implementation described herein provides reduced power consumption operation. Further, in other aspects, such implementations may reduce the number of wireless transmissions between the Tag 200 and the Fob 400, hence conserving battery power consumption. Additionally, in other aspects, as described in more detail hereinbelow, once the user is notified that an entry point (e.g., door or window) has been left open, the user can disarm the system and then close the entry point, or conversely can arm the entry point in its open state, such that when it then moves from that open position, an alert will be generated.

As shown in the embodiment of FIG. 1b, the circuit 113 comprises a first comparator 103 that has a first reference point ($V_{ref1}$) and a second comparator 108 that has a second reference point ($V_{ref2}$). In one aspect, the second reference point ($V_{ref2}$) is greater than the first reference point ($V_{ref1}$) such that the switch 109 will be activated when the input to the comparator exceeds the first reference point ($V_{ref1}$). The first comparator 103 and the first reference point ($V_{ref1}$) enables the activation of the sensor 102 so that a measurement from the magnetometer 105 is transmitted when the accelerometer 101 is activated. The first reference point ($V_{ref1}$) acts as a low threshold interrupt function and is defined such that a first level of acceleration measured by the accelerometer 101 activates the sensor 102 and enables a check for displacement of the magnetometer 105. Accordingly, the wireless communication module 115 will transmit a signal comprising the measurement of the magnetic field from the magnetometer 105. The first reference point ($V_{ref1}$) may be set at a minimal level for which the sensor 102 will determine a measured value from the accelerometer 101.

The second reference point ($V_{ref2}$) acts as a higher threshold interrupt function. The higher threshold interrupt function is defined such that a second level of acceleration measured by the accelerometer 101 provides a signal to the wireless communication module 115. The wireless communication module 115 then transmits an alarm signal or a signal to implement an alarm. As discussed above, power is applied to the wireless communication module 115 via the switch 109 when the input to the first comparator 103 exceeds the first threshold ($V_{ref1}$). The higher threshold interrupt function may also enable a check for displacement of the magnetometer 105, but it is also be configured such that when the accelerometer 101 measures a value over the second reference ($V_{ref2}$), a user will be provided a notification even if there is not a change, or a small change, in the value measured by the magnetometer 105. The higher threshold interrupt function may be indicative of a situation where an individual is attempting to break through an entry point, by striking or kicking but was not able to get through that entry point. The embodiments are not limited in this context.

As shown in FIG. 1c, the outputs of the accelerometer 101 and the magnetometer 105 may be coupled to a second circuit 131, which is part of the sensor 102. The second circuit 131 comprises a multiplexer 123, an Analog to Digital ("A/D") converter 125, a processor 127, and memory 129 for processing and/or storing the signals output by the accelerometer 101 and the magnetometer 105. In one embodiment, part or all of the implementation of the second circuit 131 may be included in the circuit 113.

Further shown in FIG. 1c, the circuit 113 comprises a third comparator 111 with a third reference point ($V_{ref3}$) coupled to the output of the magnetometer 105. The third comparator 111 is configured to compare the magnetic field measured by the magnetometer 105 to a predefined threshold level of change of the magnetic field and to enable the wireless communication module 115 to transmit an alarm signal when a level of change in the magnetic field measured by the magnetometer 105 meets or exceeds the predefined threshold level of change of the magnetic field. In another embodiment, the access node 117 may be configured to include/execute the functions of the third comparator 111.

In another embodiment, the circuit 113 may be configured to determine the level of acceleration measured by the accelerometer 101 and it also may or instead be configured to determine the level of change in the magnetic field measured by the magnetometer 105. Further, a non-transitory computer readable medium may be coupled to the circuit 113, and may be a component of the sensor 102 or may be remote from the sensor 102. The non-transitory computer readable medium can be configured to store data regarding the level of acceleration measured by the accelerometer 101 and/or data regarding the level of change in the magnetic field measured by the magnetometer 105.

Further, the circuit 113 may be configured to provide data regarding the level of acceleration measured the accelerometer 101 and/or data regarding the level of change in the magnetic field measured by the magnetometer 105 to the wireless communications module 115, and the wireless communications module 115 may be configured to transmit the data regarding the level of acceleration measured by the accelerometer 101 and/or the data regarding the level of change in the magnetic field measured by the magnetometer 105 to the access node 117.

In another embodiment, the system 100 may represent a security system installed in a user's residence or establishment. The sensor 102 may be configured to receive an arming signal from a user such that the components of the sensor 102 are active according to the embodiments described herein. The arming signal may be sent by a user from a device that communicates with the access node 117. The access node 117 may then transmit the arming signal to the sensor 102 or the user may communicate the arming signal to the sensor 102 directly, for example, via a communication device or an application on a communication device. Similarly, the sensor 102 may be configured to receive a disarming signal from a user such that the components of the sensor 102 are rendered inactive according to the embodiments described herein. In one embodiment, the wireless communications module 115 may be configured such that when a disarming signal is received by the wireless communications module 115 or the circuit 113, the wireless communications module 115 does not transmit an alarm signal following reception of the disarming signal. In another embodiment, the wireless communications module 115 may be configured such that when a standby signal is received by the wireless communications module 115 or the circuit 113, the wireless communications module 115 does not transmit an alarm signal for a period of time following receipt of the standby signal. The period of time may be predetermined or it may be uploaded to the sensor 102 by a user.

In another embodiment, the access node 117 may be configured to receive data regarding a level of acceleration measured by the sensor 102 and data regarding a level of change in a magnetic field measured by the sensor 102. The access node 117 also may be configured to transmit the data regarding the level of acceleration and the data regarding the level of change in the magnetic field to a monitoring and control system that is in communication with the access node 117. The access node 117 also can be configured to receive an alarm signal from the sensor 102 such that the access node 117 can receive the alarm signal from the sensor 102 when a predefined threshold level of acceleration of the sensor 102 is met or exceeded and/or when a predefined threshold of change in a magnetic field measured by the sensor 102 is met or exceeded. In another embodiment, the access node 117 may comprise a processor and an alarm device coupled to the processor for emitting an audible alarm. The processor is configured to cause the alarm device to emit the audible alarm upon receipt of an alarm signal at the access node 117.

In another embodiment, the access node 117 is configured to receive signals from multiple sensors 102 placed at different locations. For example, a residential house may have front, back, and side doors with a sensor 102 located at each entry point. The sensors 102 may be configured to provide an identification parameter to the access node 117 such that the access node 117 is able to distinguish between multiple sensors 102. The identification parameter may be programmed into the sensor 102 prior to sale to a user, or it may be programmed into the sensor 102 by the user during a setup or registration process for the sensor 102. In another embodiment, when a single sensor 102 or multiple sensors 102 are in use, a sensor 102 may be configured to periodically transmit a signal to ensure that the access node 117 is receiving communications from the sensor 102 and is accurately detecting the number and location of a sensor or sensors 102. The periodically transmitted signal may contain the identification parameter or other information that allows the access node 117 to identify the sensor 102. Furthermore, the periodically transmitted signal may include an indication that the power output of the sensor 102 is low or is in need of replacement so that a user is made aware before a sensor 102 goes offline.

Further, in other embodiments, the system 100 may include multiple access nodes 117 as well as multiple sensors 102, where only certain sensors 102 are associated with certain access nodes 117. For example a first access node may be associated with multiple sensors deployed on window locations and a second access node may be associated with multiple sensors deployed on door locations. In another example, a first access node is associated with multiple sensors deployed on first floor of a structure and second access node is associated with multiple sensors deployed on a second floor of the structure. In yet another example, a first access node is associated with multiple sensors deployed at a first structure, such as a house, and a second access node is associated with a sensor deployed at a second structure, such as a shed or garage.

According to the present disclosure, the access node 117 may be any form of device or software application that acts as an intermediary between the sensor 102 and a monitoring and control system that is in communication with the access node 117. Thus, the access node 117 may be for example and as a non-exhaustive list, a FOB, as described herein, a router, a modem, an exchange, a computer device, such as a laptop or personal computer, a communications device, such as a smartphone, a cell phone, or a PDA, or a server.

The access node 117 also may be configured to provide data or information received from the sensor(s) 102 to a central system, such as a monitoring and control system. The monitoring and control system may be hosted by an entity that provides services related to the use of the sensor(s) 102. Further, the monitoring and control system may comprise an application on a smartphone or other communication scheme that allows a user to manage the sensor(s) 102 by providing a user with the data or information received from a sensor 102, or a communication related thereto, and allowing the user to determine precisely which sensor 102 installation is showing a problem.

In one embodiment, the sensor(s) 102 and access node(s) 117 are configured such that they are required to be registered prior to installation of the sensor 102. Accordingly, a method for registering a sensor 102 may include registering a sensor 102 and/or access node 117 with a monitoring and control system, the monitoring and control system causing a signal to be emitted that identifies the access node 117, the monitoring and control system receiving a signal indicating registration of the access node 117, and activating a sensor 102 by transmitting a signal from the access node 117 to the sensor 102 to activate the sensor 102. In one embodiment, the sensor 102 may contain a diode that focuses energy from an adjacent wireless signal and is used to awaken/activate the sensor 102. The access node 117 may then transmit a signal to the monitoring and control system indicating that the sensor 102 is activated, and the monitoring and control system may query the user to provide information regarding the number of sensors 102 and may provide instructions to the user for deploying the sensors 102 appropriately.

The monitoring and control system may instruct the user to test an entry point with a sensor 102 installed. The user may be instructed to go to an entry point and open it and the monitoring and control system is configured to recognize the movement. Accordingly, the method may further comprise steps relating to registering a default state of a sensor 102 so that when the sensor 102 is moved from its original position to a new position, there is a point of reference to compare the magnetic field measured by the sensor 102 in the new position. Thus, the method may comprise obtaining a reference magnetic field measurement for the sensor 102. Obtaining the reference magnetic field measurement may comprise measuring a magnetic field of the sensor 102 when the sensor 102 is at a first location where the first location is defined such that the sensor 102 is in proximity to a ferrous element and the ferrous element is a component of infrastructure at which the sensor 102 is installed in proximity to. In addition, the method may comprise obtaining a second reference magnetic field measurement for the sensor 102 such that obtaining the second reference magnetic field measurement may comprise measuring the magnetic field of the sensor 102 when the sensor 102 is at a second location where the second location is defined such that the sensor 102 is a distance away from the ferrous element so that the magnetic field measured by the sensor 102 changes according to a measureable amount. In one embodiment, the user may be able to set the point of reference to be a position where a door 600 (FIGS. 6a, 6b), window 700 (FIGS. 7a, 7b), or other entry point is an open position such that a user is able to arm the system with the entry point in an open, and any further movement may trigger an alarm.

Once the reference points are established, the monitoring and control system may query the user to provide identification information about the entry point type by showing moving images of the different entry point types. The user is able to select an image and provide a label the entry point. The user will then be instructed to follow the same procedure for remaining entry points.

As part of a registration process or any time thereafter, the monitoring and control system may also prompt a user to provide a group of individuals that make up a security circle for the user. The security circle is the group of family, friends and neighbors, or communication devices associated therewith, to whom the user will have the option to forward alerts and/or notices and to receive information from the security circle regarding the alerts and/or notices. The security circle may or may not be subscribers of the monitoring and control system to which the user is subscribed. The system may be able to communicate with other applications that are associated with a user in order to obtain contact information for individuals to include in a user's security circle.

The monitoring and control system may request that a user provides a list of contacts and communication schemes for contacting these individuals and the monitoring and control system may then send a communication either informing the contacts that they are part of a user's security circle or requesting that they confirm that they authorize the monitoring and control system to contact them in the event there are alerts associated with the user's system. Further parameters for communicating to the security circle may be specified including, for example contacts from the security circle that are to be sent alerts at the same time as the user, sent alerts only when sent/forwarded manually by the user, and/or sent alerts only in the event that the user does not respond to the alerts within a predetermined period of time. In addition, in another embodiment, the user may be provided with a way of visualizing other subscribers of the monitoring and control system that are within various distances (such as concentric circles) of the user's residence. The user may be to communicate, on an entirely anonymous basis, with these subscribers. The user may have the option of introducing themselves to specific subscribers and registering them in the user's security circle.

Figure 1D:
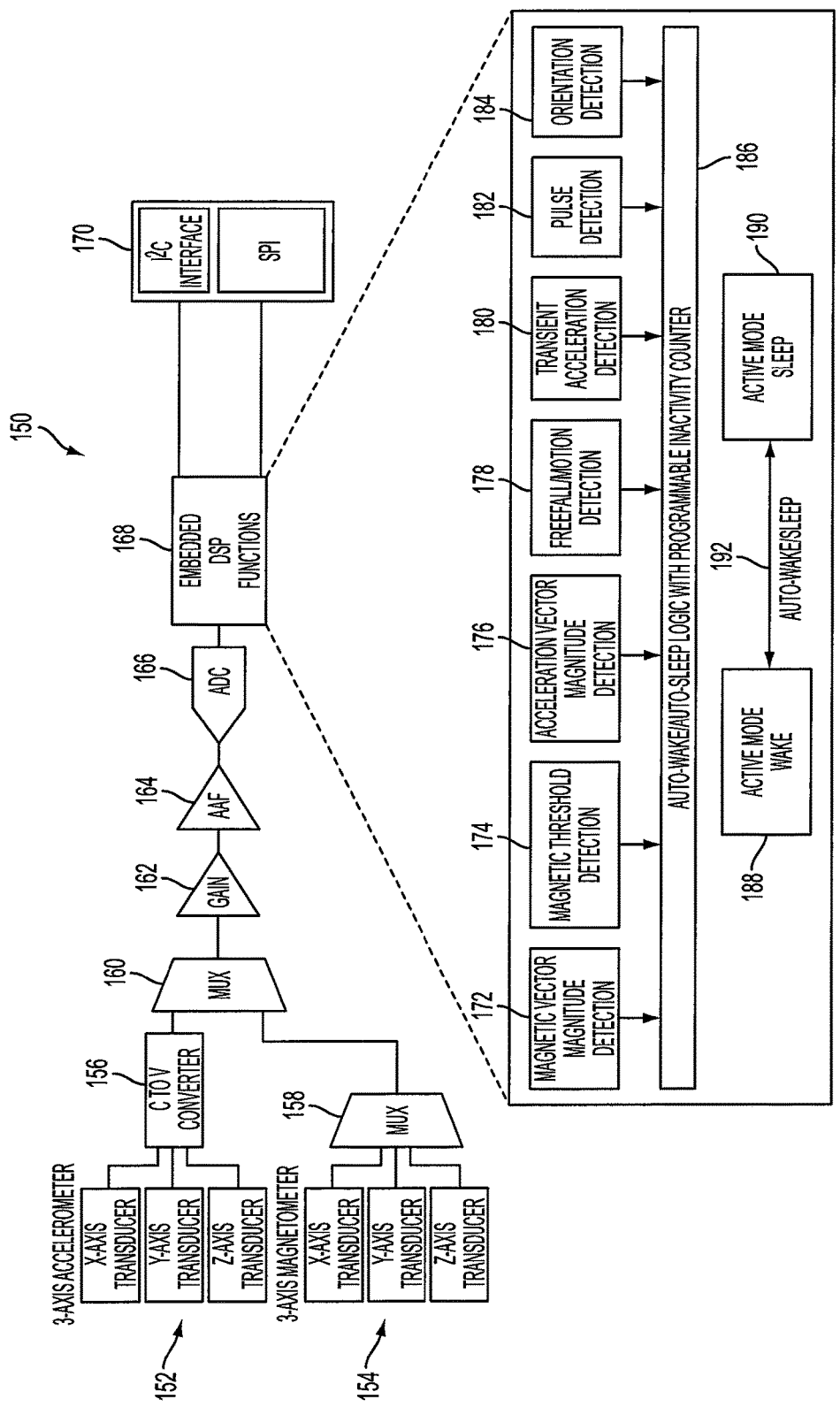
FIG. 1d is a schematic diagram of a digital sensor comprising a 3D accelerometer and a 3D magnetometer for detecting displacement according to one embodiment of the present disclosure.

FIG. 1d is a schematic diagram of a digital sensor 150 comprising a 3D accelerometer 152 and a 3D magnetometer 154 for detecting displacement according to one embodiment of the present disclosure. In one embodiment, the digital sensor 150 is an integrated circuit known as a FXOS8700CQ digital sensor from Freescale Semiconductor, which provides the 3D accelerometer 152 (±2 g/±4 g/±8 g) and the 3D magnetometer 154 in one integrated circuit package. The FXOS8700CQ 6-axis Xtrinsic sensor 150 combines a 14-bit accelerometer 152 and a 16-bit magnetometer 154 in a small 3×3×1.2 mm QFN plastic package. The accelerometer 152 and magnetometer 154 are combined with a high-performance ASIC to enable an electronic compass solution capable of a typical orientation resolution of 0.1° and sub 5° compass heading accuracy for most applications.

The 3D accelerometer 152 is a three axis (x-y-z) accelerometer where the outputs of each axis are provided to a current-to-voltage converter 156. The output of each axis of the three axis (x-y-z) magnetometer 154 is provided to a first multiplexer 158. The output of the first multiplexer 158 and the output of the current-to-voltage converter 156 are provided to a second multiplexer 160. Thus, the outputs of the accelerometer 152 and the output of each axis of the magnetometer 154 can be sampled by controlling the states of the first and second multiplexers 158, 160. The sampled output of the second multiplexer 160 is applied to gain amplifier stage 162 and the output of the gain amplifier stage 162 is applied to an anti-aliasing filter 164 (AAF). The output of the AFF 164 is applied to the input of an analog-to-digital converter 166 (ADC). The output of the ADC 166 is applied to an embedded digital signal processing (DSP) functional module 168. The DSP 168 output is provided to an interface 170, which includes an I$^2$C (Inter Integrated Circuit Communications) and SPI (or Serial-Peripheral interface), which are protocols that can link a microcomputer to other microprocessors or integrated circuits. Both protocols are widely used in electronics.

The DSP 168 functions include one or more detection modules coupled to an auto-wake/auto-sleep logic with programmable inactivity counter 186. The detection modules can include, without limitation, a magnetic vector magnitude detection module 172, a magnetic threshold detection module 174, an acceleration vector magnitude detection module 176, a freefall/motion detection 178, a transient acceleration module 180, a pulse detection module 182, and an orientation module 184. The detection modules 172-184 are coupled to the logic 186. Active mode wake 188 and active mode sleep 190 modes are enabled by an auto-wake/sleep signal 192. The DSP 168 may be programmed to perform some of the functions described herein.

Figure 12:
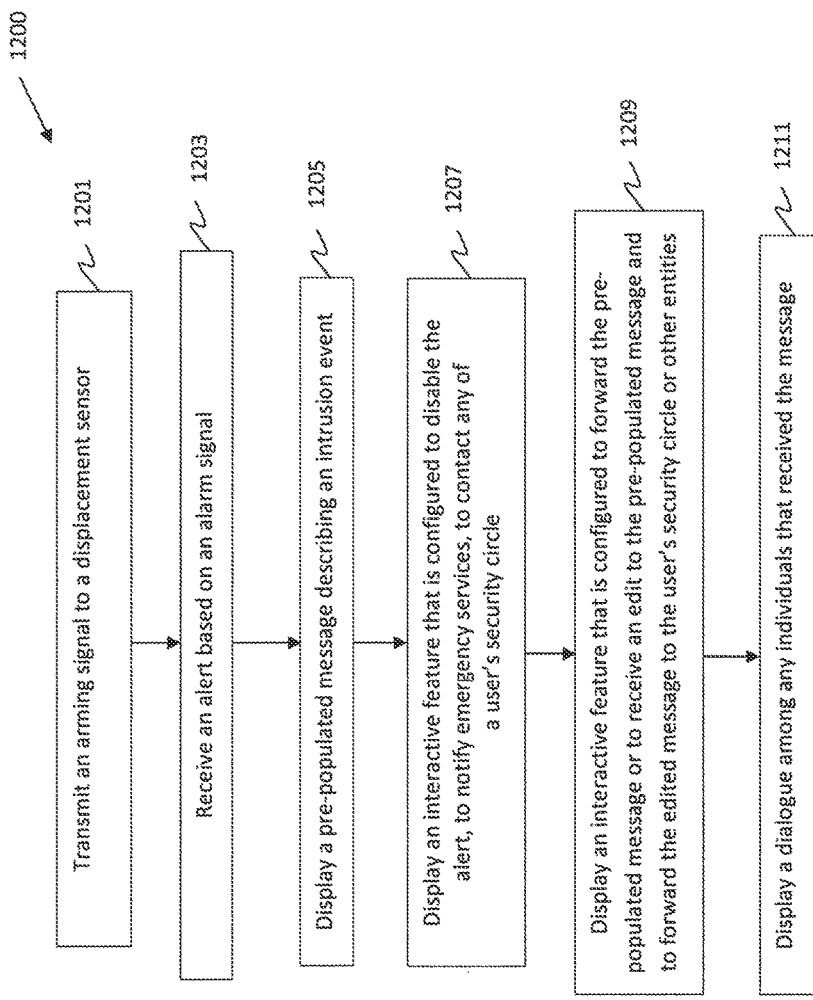
FIG. 12 is a logic diagram illustrating of one embodiment of a method for reporting a detection a displacement sensor in a system as described herein.

As shown in FIG. 12, a method 1200 for reporting displacement of a sensor is disclosed. With reference now also to FIGS. 1a-1c, the system 100 may be configured to transmit 1201 an arming signal to a displacement sensor 102 from a device associated with the user. When an intrusion event is detected, the device receives 1203 an alert from the monitoring and control system. The alert may be sent to the user's security circle instead of or in addition to the user. In one embodiment, the alert may be sent based on the receipt of an alarm signal from the access node 117 or the sensor 102. The system 100 displays 1205 the alert on the device. The display may comprise a pre-populated message describing the intrusion event, including the name of the user or other information about the location of the user's system that detected the intrusion event along with the entry point(s) involved. Further, within the alert, the system 100 displays 1207 an interactive feature to the user to provide the user with the ability to disable the alert, the ability to notify the emergency services, such as police/911, and the ability to contact any of the user's security circle by. The interactive feature may be displayed 1207 as an icon, for example, that implements at least one of these functions. The user may be given the option of sending the pre-populated message as is or editing the message and sending the edited message to the user's security circle or other entities. Accordingly, the system 100 displays 1209 the interactive feature that is configured to forward the pre-populated message or to receive an edit to the pre-populated message and to forward the edited message. The user also may be given the ability to send a message to other anonymous subscribers in the area. Further, once the message is sent, the system 100 may display 1211 all dialogue among the security circle and any anonymous members that received the message. In an embodiment, when the initial arming signal is received, the monitoring and control system may transmit a notice to the user and/or the user's security circle that system is armed.

With reference now back to FIGS. 1a-1d, in one embodiment, the circuit 113 may be implemented as a processor and/or appropriate hardware to carry out the functions described. The processor may be configured to determine whether the predefined threshold level of change in the magnetic field is met or exceeded and whether the predefined threshold level of acceleration is met or exceeded. Further, the processor may be configured to determine at least one of a time that the predefined threshold level of change in the magnetic field is met or exceeded or a time that the predefined threshold level of acceleration is met or exceeded. In addition, the wireless communications module 115 may be configured to transmit an information signal that comprises at least one of data regarding the time that the predefined threshold level of change in the magnetic field is met or exceeded or data regarding the time that the predefined threshold level of acceleration is met or exceeded.

In another embodiment, the sensor 102 may comprise a non-transitory computer readable medium such that at least one of data regarding a time that the predefined threshold level of change in the magnetic field is met or exceeded or data regarding a time that the predefined threshold level of acceleration is met or exceeded is stored in the non-transitory computer readable medium. The data stored in the non-transitory computer readable medium may be provided to the wireless communication module 115 at some point for transmitting the data to the access node 117 or another device that receives the data.

In addition, the functions described above regarding the circuit 113 and other appropriate components may be performed by hardware or software. If the functions are performed by software, the software may reside in software memory (not shown) in the sensor 102. The software in software memory may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions.

In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3B:
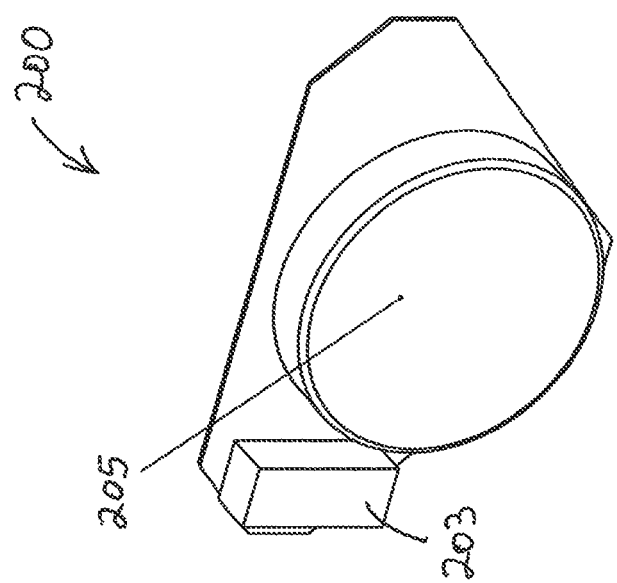
FIG. 3b is a rear view of the unitary displacement sensor shown in FIG. 1, without the casing.
Figure 3A:
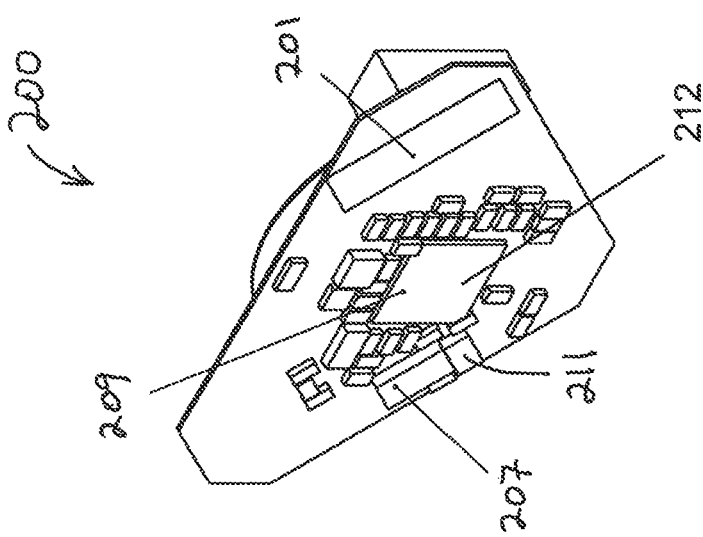
FIG. 3a is a front view of the unitary displacement sensor shown in FIG. 1, without the casing.

In another embodiment shown in FIGS. 2-3b, a displacement sensor 200, which does not require a paired device and is also referred to herein as a "Tag," comprises a device for measuring a magnetic field 211, such as magnetometer, a device for measuring acceleration 207, such as an accelerometer, a power source 205, such as a battery, a component for wireless transmission 209, a circuit 212, such as a microprocessor, and an antenna 211 that are assembled on a circuit board 213 substrate. The sensor 200 is formed with a casing, which is shown as a front casing 215 and a back casing 217. The back casing 217 may include an attachment mechanism for the sensor 200, which may be based on, for example, the use on screws or other fasteners, adhesive, hook and loop fasteners, or some combination thereof. Further, the front and back casing may be made of any material suitable for the application, such as for example, plastic, rubber, or fiberglass, and may take on an aesthetically pleasing appearance based on color, shape, or texture of the material. In another embodiment, the component for wireless transmission and the antenna may be included as a wireless transmission module. Further, the wireless communications module may be a Wi-Fi embedded microchip or a ZigBee embedded microchip.

The circuit 209 is configured to cause the power source 205 to activate the wireless component 207 and the magnetometer 201 when a level of acceleration measured by the accelerometer 203 meets or exceeds a predefined threshold level of acceleration and is also configured to cause the wireless component 207 to transmit a signal when a level of change in the magnetic field measured by the magnetometer 201 meets or exceeds a predefined threshold level of change in the magnetic field.

As discussed, the magnetometer 201 is used to confirm any displacement of the sensor 200, and the accelerometer 203 is used to conserve power consumption by only allowing the other components to draw power when the Tag 200 experiences some sort of acceleration, in the form of vibration or actual movement. In an embodiment, to conserve power, the magnetometer 201 is awakened and draws power if the accelerometer's 203 interrupt function is triggered by a minimum amount of acceleration, in the form of vibration or actual movement. In addition, the magnetometer 201 may be checked periodically (every 10-15 seconds) to see if there has been a displacement, the purpose being to identify any intrusion where there has been a very slow opening that does not trigger the minimum threshold of the accelerometer 203. The accelerometer 203 may also have a second threshold, which is higher than the interrupt threshold, above which the user will be notified of a strong vibration at the door or window even if the magnetometer 201 does not recognize displacement of the Tag 200 (i.e., someone is kicking at user's door, but hasn't successfully opened the door).

In one embodiment, the bottom corner in the sensor comes to a 90° angle so that the Tag 200 fits into the corner of a door or window in an aesthetically pleasing manner. The accelerometer 203 and magnetometer 201 may be angled such that they will be parallel with the ground once applied.

As part of a security system, the displacement sensor may be complemented by and in communication with an access node, such as a FOB. FIG. 4 shows one embodiment of a FOB 400 according to the present disclosure. The FOB 400 comprises an Ethernet jack and cord 401, a sheath 403 covering the Ethernet cord, a plastic casing 405, 407 that encloses a printed circuit board 409, a wireless transceiver 411, a microprocessor 413, and electronic components, such as an Ethernet chip 417, that terminate the Ethernet cord and attach it to the other components. In the embodiment shown in FIG. 4, the FOB also comprises an alarm device 415, such as for example, a piezo, which generates the audible alarm. The FOB also may comprise a port that connects to a power cord, such as for example, a USB port. In another embodiment, the wireless transceiver may comprise a ZigBee module and an antenna for the ZigBee signal. The ZigBee module operates in accordance with a specification for a suite of high level communication protocols used to create personal area networks built from small, low-power digital radios. ZigBee is based on an IEEE 802.15 standard. Though low-powered, ZigBee devices can transmit data over long distances by passing data through intermediate devices to reach more distant ones, creating a mesh network; i.e., a network with no centralized control or high-power transmitter/receiver able to reach all of the networked devices. The decentralized nature of such wireless ad hoc networks makes them suitable for applications where a central node cannot be relied upon.

This FOB 400 is sized and configured to plug into the Ethernet jack of a computer or router and will receive any information from the sensor 200 and forward that information to web servers that will interpret the data and determine if the user needs to be informed of an intrusion and whether the alarm should be sounded. The web servers may constitute or be part of a monitoring and control system that a user subscribes to with the use of the sensor.

Once an intrusion has been identified based on signals provided by the sensor, the monitoring and control system may issue a notice to a user. The notice may be sent via an application on a user's smartphone, computer, or other device, via email, via text and/or phone, if the user so chooses. In an embodiment, during an enrollment process for a sensor, such as a Tag 200 and/or access node, such as a FOB 400, the user may specify the communication scheme at which the user would like to receive the notice. An alert may display the nature of the intrusion, including the relevant entry point, and will give the user the option to either forward the alert to their predefined security circle.

An application of the Tag 200 and FOB 400 as part of a security system is shown in FIGS. 5a, 5b, 6a, 6b, 7a, and 7b. In FIGS. 5a and 5b, the FOB 400 is plugged into one of the Ethernet Jacks in the user's router 500. The FOB 400 may then be connected to a power source. For example, the FOB may be connected, by an AC adaptor, to a wall outlet for a power source.

FIGS. 6a and 6b demonstrate the deployment of a Tag 200 on a door 600 located within a frame 601. The frame 601 around the door 600 is shown without the finishing materials, and shows the 2×4-based wooden frame 601 in which the door 600 is mounted during building construction. These frames 601 are configured such that a number of them come together at each upper corner of the door 600, where a number of ferrous metal nails, screws, or other fasteners 603 are generally used to secure the frame 601. Once the Tag 200 is placed at the corner of the door 600 and the door 600 is opened, the Tag 200 will move away from this group of ferrous metal nails, screws, or other fasteners 603, thus creating a change in the magnetic field surrounding the sensor 200.

FIGS. 7a and 7b demonstrate the deployment of a Tag 200 on a window 700 located within a frame 701. The frame 701 around the window 700 is shown without the finishing materials, and shows the frame 701 in which the windows are mounted during building construction. These frames 701 are configured such that a number of them come together at each lower or upper corner of the window 700, where a number of ferrous metal nails, screws, or other fasteners 703 are generally used to secure the frame 701. Once the Tag 200 is placed at the corner of the window 700 and the window 700 is opened, the Tag 200 will move away from this group of ferrous metal nails, screws, or other fasteners 703, thus creating a change in the magnetic field surrounding the sensor 200.

In various embodiments, the concepts described in connection with FIGS. 6a, 6b, 7a, 7b can be employed both swinging and sliding doors and windows, without limitation. A change in magnetic field based on ferrous metal fasteners embedded in the frame structure will confirm that the sensor, and whatever it is attached to, has moved or has been displaced.

The setup of the FOB 400 and Tag 200 is designed to be as easy as possible for the user:

1. The user signs into the website or the app. Web servers then immediately emit a continuous signal over the user's network to identify the FOB as soon as it is plugged into a connected Ethernet outlet.

2. Once the Tags are activated, the website/app will recognize their presence and present a message to the user that a certain number of Tags have been recognized, and will ask the user to confirm the number of Tags.

3. The website/app then instructs the user to deploy the Tags and then they are done. Moving images are displayed of the different entry point types and where the Tag should be placed.

4. The user is then offered the option to test and name the entry points. If the user chooses yes, he is instructed to go to an entry point and open it. The system will recognize the movement and ask the user to identify the entry point type by showing moving images of the different entry point types. The user will select one image, and then the user will be prompted to name the entry point. The user will then be instructed to follow the same procedure for the remaining entry points.

The user will also be presented the option to set up their security circle, which is the group of family, friends and neighbors to whom the user will have the option to forward any alerts. The setup of this security circle will go as follows:

1. The website/app will prompt the user to set up their security circle. If the user says yes, present a list of the user's contacts, and allow them to select contacts that they want to include.

2. All contacts that are chosen are sent an email saying that they are not part of the user's network. Each contact will automatically become a member of the system. If a contact's home address is available in the user's contact list, that address will be converted to location coordinates (to avoid privacy concerns associated with saving the actual address) so that as a member the contact's location can be used. The users will also be encouraged to download the app to facilitate the handling of alerts.

1. This email will also include an offer to purchase a system themselves.

2. Once the security circle is complete, the user is given the option to select contacts that will be either sent alerts at the same time as the user is, is within a predetermined amount of time after an alert is sent in the event that the user does not address the alert.

3. The user will be provided visibility into the number of users that are within various distances (such as concentric circles) from their residence. The user can communicate, on an entirely anonymous basis, with these users. The user will have the option of introducing themselves to specific users.

Once an intrusion has been detected, the user will be notified via the smartphone app, and the user will be provided with options to address the alert:

1. Disable the alert
2. Button to call police/911
3. A list of the user's Security Circle. All members of the Security Circle will be preselected, and the user can choose to select certain members.
4. A pre-populated message describing the event, including the name of the entry point involved. This message can be edited, or sent as is.
5. The user can also send a message to other anonymous users in the area.
6. Once a message is sent, the user is presented with a message screen showing all dialogue among the Security Circle and any anonymous members.

The advantages of the embodiments of the displacement sensor described herein include, without limitation, smaller size, superior performance, lower cost, ease of use, and less aesthetically obtrusive. Accordingly, in one embodiment, the present disclosure comprises a one piece displacement sensor.

Methods and processes of the present disclosure are also described herein. The methods and processes described may be performed by hardware or software. If the process or method is performed by software, the software may reside in whole or in part in software memory (not shown) in the sensor 102, access node 117, or monitoring and control system depending upon the process or method. The software in software memory may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions.

Accordingly, a method for detecting displacement of a sensor comprises measuring a level of acceleration of the sensor, comparing the measured level of acceleration to a predefined threshold level of acceleration, activating a wireless communications module when the predefined threshold level of acceleration is met or exceeded, measuring a level of change in a magnetic field, comparing the measured level of change in the magnetic field to a predefined threshold level of change of the magnetic field, and transmitting a signal when the predefined threshold level of change of the magnetic field is met or exceeded. In another embodiment, the method may further comprise steps relating to registering a default state of the sensor so that when the sensor is moved from its original position to a new position, there is a point of reference to compare the magnetic field measured by the sensor in the new position. Thus, the method may comprise obtaining a reference magnetic field measurement for the sensor. Obtaining the reference magnetic field measurement may comprise measuring a magnetic field of the sensor when the sensor is at a first location where the first location is defined such that the sensor is in proximity to a ferrous element and the ferrous element is a component of infrastructure at which the sensor is installed. In addition, the method may comprise obtaining a second reference magnetic field measurement for the sensor such that obtaining the second reference magnetic field measurement may comprise measuring the magnetic field of the sensor when the sensor is at a second location where the second location is defined such that the sensor is a distance away from the ferrous element so that the magnetic field measured by the sensor changes according to a measureable amount.

In another embodiment, the method comprises transmitting a notice of an intrusion to at least one of a user or a security circle of a user based on receiving the signal. Further, the notice may be transmitted to the user based on a preselected communication scheme of the user and the notice may comprise details regarding the intrusion. During a registration or subscription process a user may be able to provide information to a monitoring and control system that hosts an application for the sensor that provides the notice of such an intrusion. At this time, or any other time thereafter, the user may be able to program contact numbers, such as for example, a cell phone number, or communication methods, such as for example, a call, an email, a text message, for devices that under control of or associated with the user.

Figure 8:
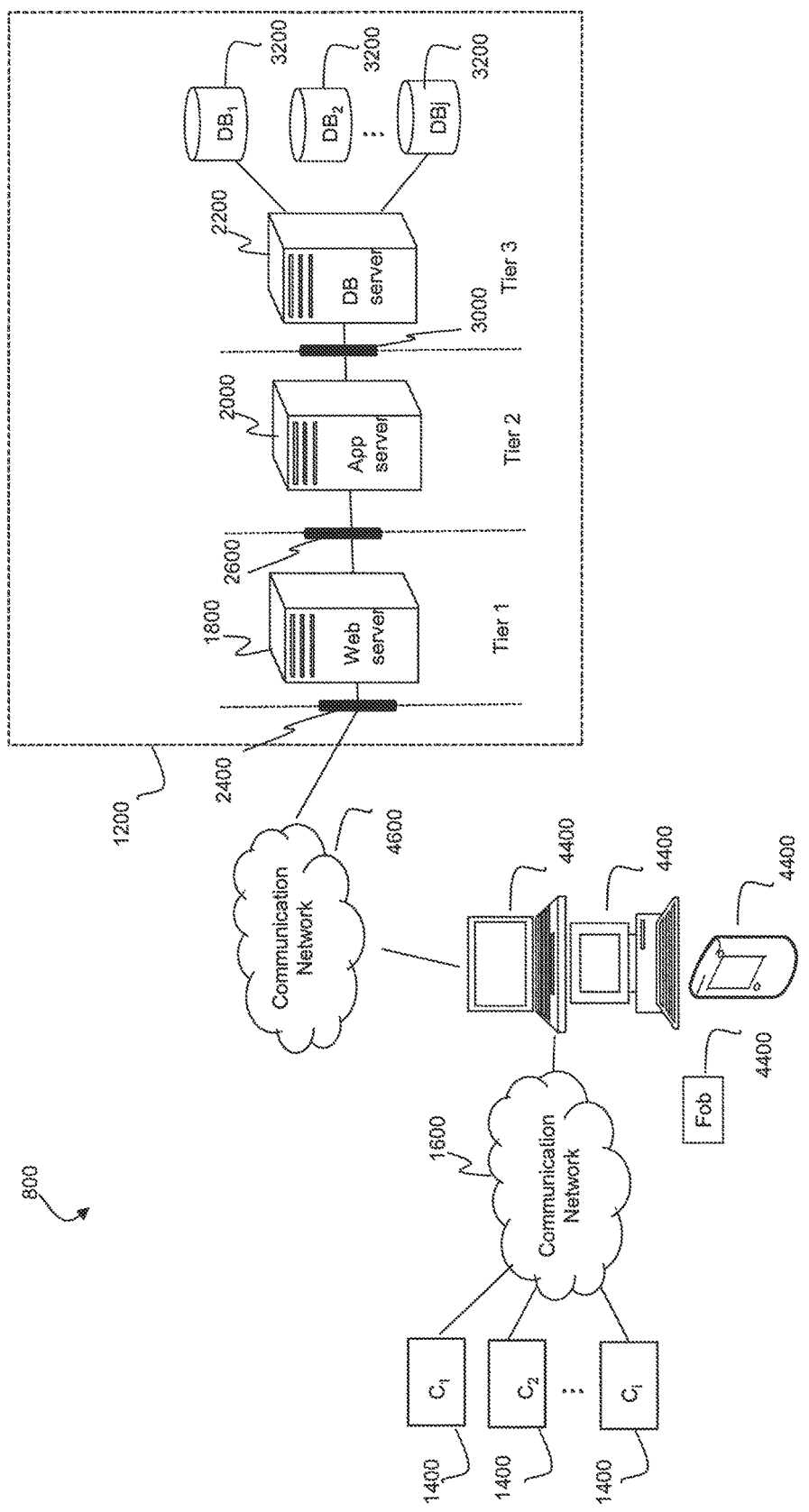
FIG. 8 illustrates an example network architecture and computing environment for various embodiments of the present disclosure.

FIG. 8 illustrates a network architecture and computing environment for an embodiment of a system for detecting displacement of a sensor. FIG. 8 illustrates a system 800 according to embodiments of the present disclosure. As shown in FIG. 8, the system 800 includes one or more sensors, represented as client devices $C_1, C_2, \ldots, C_i$ 1400 (hereinafter referred to as "clients 1400") in communication with access nodes, represented as one or more remote computing devices 4400 via a communications network 1600 and the computing devices 4400 are in communication with a host system 1200 via a communications network 4600. In some embodiments, the communication networks 1600 and 4600 may be a common communication network (e.g., the Internet). In certain embodiments, the host system 1200 and/or the computing devices 4400 may implement some or all of the aspects of the monitoring and control system described herein, respectively, and the clients 1400 may implement some or all of the aspects of the sensor described herein.

While the communications networks 1600 and 4600 may be the Internet, it will be appreciated that any public or private communication network, using wired or wireless channels, suitable for enabling the electronic exchange of information between the clients 1400, the computing devices 4400, and the host system 1200 may be utilized. The one or more of the communications networks 1600 and 4600 can be any network or combination of networks that can carry data communications. Such networks can include, but are not limited to, wireless data networks such as a Wi-Fi, 3G, and a 4G/LTE network. In addition, the communications networks 1600 and 4600 shown in FIG. 8 can include, but are not limited to a wired Ethernet network, a local area network (LAN), a medium area network, and/or a wide area network (WAN) such as the Internet. In example implementations of system 800 including wireless networks, one or more of the communications networks 1600 and 4600 can support protocols and technology including, but not limited to, Internet or World Wide Web protocols and/or services. Intermediate network routers, gateways, or servers (not shown) may be provided between components of the system 800 depending upon a particular application or environment.

According to example embodiments, the host system 1200 may be implemented by an institution, (hereinafter referred to as a 'host institution') such as for example, a security firm that monitors locations where system for detecting displacement of a sensor is implemented. In additional embodiments, the functional aspects of the computing devices 4400 can be included within the host system 1200, and the clients 1400 are configured to communicate with, provide information to, and receive commands from the host system 1200, directly.

In one embodiment, the clients 1400 may include any form of network-enabled communications module configured to transmit and receive information via the communications network 1600 using a wired or wireless connection. Clients 1400 are capable of receiving user input from the computing devices 4400 via the communications network 1600. In example embodiments, a computing device 4400 can be, but is not limited to, a FOB, a personal computer (PC), may be PCs and/or other network-enabled devices (e.g., cell phones, mobile phones, mobile tablets, PDAs, etc.) configured to transmit and receive information via the communication networks 1600, 4600 using a wired or wireless connection. Furthermore, the computing devices 4400 may be an iPhone™, an iPod™, an iPad™, a device operating the Android operating system ("OS") from Google Inc., a device running the Microsoft Windows® Mobile OS, a device running the Microsoft Windows® Phone OS, a device running the Symbian OS, a device running the webOS from Hewlett Packard, Inc., a mobile phone, a BlackBerry® device, a smartphone, a hand held computer, a netbook computer, a palmtop computer, a laptop computer, an ultra-mobile PC, a portable gaming system, or another similar type of mobile computing device having a capability to communicate with clients 1400 and the host system 1200 via the communications networks 1600, 4600. The computing devices 4400 may include a suitable browser software application (e.g., Internet Explorer, Internet Explorer Mobile, Chrome, Safari, Firefox, Blazer, etc.) for enabling the user to display and interact with information exchanged via the communication networks 1600, 4600.

According to embodiments, an input device of the computing device 4400 may be one or more of a touch-sensitive display such as a touch screen interface, a keyboard, a microphone, or a pointing device such as a mouse or stylus. The computing device 4400 also include a display device capable of rendering an interactive Graphical User Interface ("GUI"), which may be associated with an application installed on computing device 4400, for providing commands to the clients 1400. The input device allows a user to interact with the GUI to instruct the clients 1400, and to display and edit information, which is rendered in the display device. The computing devices 4400 may thus access and navigate static and/or dynamic HTML documents of the GUI. Alternatively, the GUI can be rendered on a display device of one or more servers, such as a web server 1800, application server 2000, and database server 2200 shown in FIG. 8.

A display device of the computing device 4400 can differ depending on the application of the fluid control system. For example, a display device of a tablet device, netbook, or laptop is typically an integrated LCD screen, which is often smaller than a monitor or console such as the display device for a workstation or desktop PC. Similarly, the display device of a mobile computing device may be a relatively small display such as mobile phone display.

The input devices can also vary depending on the characteristics of a particular computing device 4400 and its display device. For example, the input device of a tablet, netbook, or laptop may include a relatively small physical or touchscreen keyboard, an integrated camera, track pad, and/or microphone, while the input device of a desktop PC or workstation client will typically include a physical QWERTY or Dvorak keyboard and a mouse. Also, for example, an input device of a mobile device will typically lack a full physical keyboard and may instead comprise one or more of a touch-screen keyboard, a microphone, an integrated camera, a track pad, a scroll wheel, a track ball, a T9 keyboard, a button, and a touch screen display device. In embodiments, a display device can be a touch screen display. It is to be understood that in the case of a touch screen interface, the input device can be anything capable of interacting with the touch screen, including a user's fingers, which can be used to select, slide, drag, and resize (i.e., expand, maximize, shrink, and/or minimize) interactive user interface ("UI") elements through pointing, pinching, and scrolling gestures.

According to embodiments, UIs for mobile computing devices may be rendered as streamlined 'mobile friendly' versions of the 'full' UI for ease of use on relatively small display devices. In embodiments, mobile friendly UIs may have reduced capabilities and/or display a lesser level of detail as compared to full UI. A mobile friendly UI can also be tailored to accept input from input devices for a specific platform of a mobile computing device. Mobile friendly UIs can be automatically selected by the system 1000 in response to detecting one or more platform characteristics of a particular mobile computing device. Alternatively, a user of a mobile computing device can be prompted within the full UI to opt-in to using the mobile friendly UIs in response to detecting that the computing device is accessing the host system 1200 via a mobile computing device. In cases where a user's mobile computing device has display devices and input devices capable of using the full UI, the user may not wish to use the mobile friendly UI.

In accordance with embodiments, the UI can be tailored to or customized for a particular computing device 4400 based on the capabilities of the platform used by that computing device. The platform comprises physical capabilities of the computing device such as, memory capacity in terms of random access memory (RAM) and read only memory (ROM), central processing unit (CPU) capabilities in terms of clock speed and available processing capacity, available storage in terms of disk space or flash memory, communications capabilities in terms of current wired and/or wireless network connectivity and a communications interface such as a network interface card ("NIC") of the computing device, capabilities of the display device, and capabilities of the input device. These physical capabilities and others can be determined based on a manufacturer, model number, serial number, a Media Access Control address ("MAC address") and/or another unique identifier of a computing device 4400.

The platform of a computing device 4400 also comprises software and firmware components, such as an operating system ("OS") running on the computing device 4400, Internet browser(s), native software applications installed, and privileges/permissions associated with the computing device. The privileges/permissions may be controlled by the host system 1200 based on a user and/or an entity associated with the computing device and can include data access, communications, and application execution privileges.

In the example embodiment depicted in FIG. 8, the host system 1200 can be based on a multi-tiered network architecture, and can include one or more of a web server 1800 (Tier 1), an application server 2000 (Tier 2), and a database server 2200 (Tier 3). According to this embodiment, the web server 1800 corresponds to the first tier of the host system 1200 and is configured to communicate with the communication network 4600 via a border firewall 2400, and with the application server 2000 via an application firewall 2600. The web server 1800 can be configured to accept information requests, such as, for example, HTTP requests, from one or more of the computing devices 4400 via the communication network 4600 and to provide responses thereto. The responses may include, for example, HTTP responses including static and/or dynamic HTML documents for providing a GUI to users via the computing devices 4400. Additionally, the web server 1800 may further be configured to authenticate each user before allowing access to a GUI and other resources associated with the host system 1200. Authentication may be performed, for example, by validating a received account identifier ("ID") or user name and a corresponding password. The ID/user name and password may be input in the GUI using an input device of the computing device 4400.

With continued reference to the example embodiment of FIG. 8, the application server 2000 corresponds to the second tier of the host system 1200 and can be configured to communicate with the web server 1800 via the application firewall 2600, and with the database server 2200 via an internal firewall 3000. The application server 2000 may host one or more applications executing logic to provide features to each user of the fluid control system via a respective user interface ("UI"). The application server 3000 may receive account credentials (e.g., an account ID/user name and password), input and selections (e.g., a request to access data management features) from the UI associated with each client 1400 via the web server 1800. Based on this and other information received from the clients 1400 applications hosted by the application server 2000 may be invoked to perform various calculations or data manipulation functions and generate corresponding informational content. Informational content may be communicated to the web server 1800 and subsequently presented to a user associated with computing device 4400 using, for example, a dynamic web page or interactive GUI. Additionally, the application server 2000 may also host an application for enabling users to conduct email communication with the parties associated with the host system 1200 and other parties, for example other subscribers based on alerts or other informational content associated with the system 800.

In the embodiment shown in FIG. 8, the database server 2200 corresponds to the third tier of the host system 1200 and is configured to communicate with the application server 2000 via the internal firewall 3000. The database server 2200 manages one or more databases $DB_1$, $DB_2, \ldots, DB_i$ 3200 (hereinafter referred to as "databases 3200") which store data to support one or more applications hosted by the application server 2000 or elsewhere. Such databases may include, for example, stored information databases, client configuration databases, user reporting databases, user identification/authentication databases, user preferences/settings databases, as well as databases for storing other settings and/or configuration data. Database information requested by a particular application is retrieved from the databases 3200 by the database server 2200, communicated to the requesting application, and updated by the database server 2200 as needed. Additionally, although only a web server 1800, application server 2000, and database server 2200 are depicted in FIG. 8, it is to be understood that in certain embodiments, the functionalities of one or more of these servers can be implemented cluster of computing devices operating in a cluster or server farm.

As described below with reference to FIG. 9, part or all of one or more aspects of the methods and system discussed herein may be distributed as an article of manufacture that itself comprises a computer readable medium having computer readable code means embodied thereon.

The computer readable program code means is operable, in conjunction with a computer system, to carry out all or some of the steps to perform the methods or create the system discussed herein. The computer readable medium may be a recordable medium (e.g., hard drives, compact disks, EPROMs, or memory cards). Any tangible medium known or developed that can store information suitable for use with a computer system may be used. The computer-readable code means is any mechanism for allowing a computer to read instructions and data, such as magnetic variations on a magnetic media or optical characteristic variations on the surface of a compact disk. The medium can be distributed on multiple physical devices (or over multiple networks). For example, one device could be a physical memory media associated with a terminal and another device could be a physical memory media associated with a processing center.

The computer devices, systems, and servers described herein each contain a memory that will configure associated processors to implement the methods, steps, and functions disclosed herein. Such methods, steps, and functions can be carried out, e.g., by processing capability on mobile device, POS terminal, payment processor, acquirer, issuer, or by any combination of the foregoing. The memories could be distributed or local and the processors could be distributed or singular. The memories could be implemented as an electrical, magnetic or optical memory, or any combination of these or other types of storage devices. Moreover, the terms "memory", "memory storage", "memory device", or similar terms should be construed broadly enough to encompass any information able to be read from or written to an address in the addressable space accessed by an associated processor.

Aspects of the present disclosure discussed with regards to and shown in FIGS. 1-8, or any part(s) or function(s) thereof as appropriate, may be implemented using hardware, software modules, firmware, tangible computer readable media having instructions stored thereon, or a combination thereof and may be implemented in one or more computer systems or other processing systems.

Figure 9:
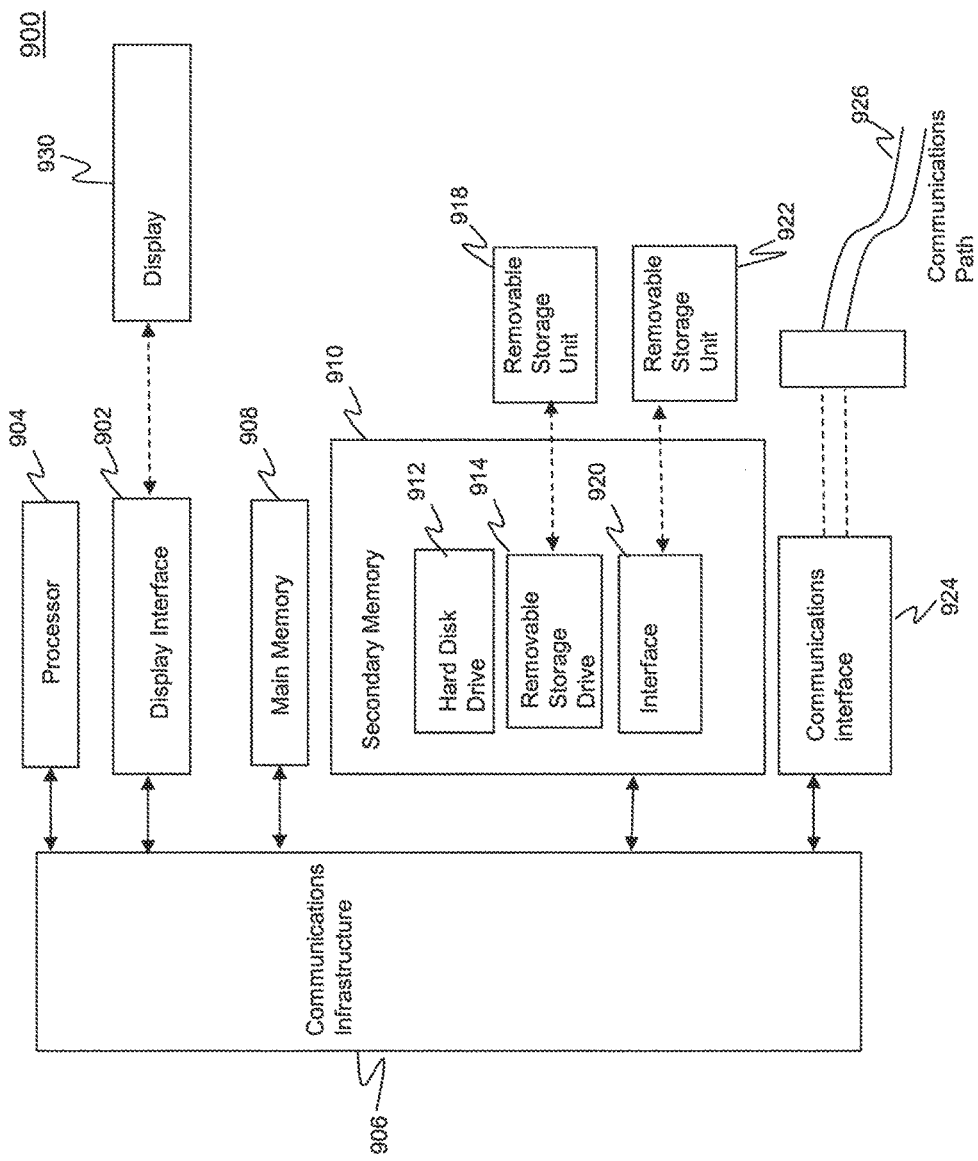
FIG. 9 is a diagram of an example computer system in which embodiments of the present disclosure may be implemented.

FIG. 9 illustrates an example computer system 900 in which embodiments of the present disclosure, or portions thereof, may be implemented as computer-readable code. For example, the various aspects of the user interface can be implemented in computer system 900 using hardware, software, firmware, non-transitory computer readable media having instructions stored thereon, or a combination thereof and may be implemented in one or more computer systems or other processing systems. Hardware, software, or any combination of such may embody any of the modules and components used to implement the network, systems, methods and GUI described above. For example, some or all of the aspects, as appropriate, of the computing devices 4400, web server 1800, application server 2000, and/or database server 2200 described above with reference to FIG. 8 can be implemented using computer system 900.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments. A processor device may be a single processor, a plurality of processors, or combinations thereof. Processor devices may have one or more processor "cores."

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

The processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

The computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a floppy disk drive, a magnetic tape drive, an optical disk drive, a flash memory, or the like.

The removable storage drive 914 may read from and/or writes to a removable storage unit 918 in a well-known manner. The removable storage unit 918 may comprise a floppy disk, magnetic tape, optical disk, Universal Serial Bus ("USB") drive, flash drive, memory stick, etc. which is read by and written to by removable storage drive 914. As will be appreciated by persons skilled in the relevant art, the removable storage unit 918 includes a non-transitory computer usable storage medium having stored therein computer software and/or data.

In alternative implementations, the secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

The computer system 900 may also include a communications interface 924. The communications interface 924 allows software and data to be transferred between the computer system 900 and external devices. The communications interface 924 may include a modem, a network interface (such as an Ethernet card), a communications port, a PCMCIA slot and card, or the like. Software and data transferred via the communications interface 924 may be in the form of signals, which may be electronic, electromagnetic, optical, or other signals capable of being received by communications interface 924. These signals may be provided to the communications interface 924 via a communications path 926. The communications path 926 carries signals and may be implemented using wire or cable, fiber optics, a phone line, a cellular/wireless phone link, an RF link or other communications channels.

In this document, the terms 'computer readable storage medium,' 'computer program medium,' 'non-transitory computer readable medium,' and 'computer usable medium' are used to generally refer to tangible and non-transitory media such as removable storage unit 918, removable storage unit 922, and a hard disk installed in hard disk drive 912. Signals carried over the communications path 926 can also embody the logic described herein. The computer readable storage medium, computer program medium, non-transitory computer readable medium, and computer usable medium can also refer to memories, such as main memory 908 and secondary memory 910, which can be memory semiconductors (e.g. DRAMs, etc.). These computer program products are means for providing software to computer system 900.

Computer programs (also called computer control logic and software) are generally stored in a main memory 908 and/or secondary memory 910. The computer programs may also be received via a communications interface 924. Such computer programs, when executed, enable computer system 900 to become a specific purpose computer able to implement the present disclosure as discussed herein. In particular, the computer programs, when executed, enable the processor device 904 to implement the processes of the present disclosure discussed below. Accordingly, such computer programs represent controllers of the computer system 900. Where the present disclosure is implemented using software, the software may be stored in a computer program product and loaded into the computer system 900 using the removable storage drive 914, interface 920, and hard disk drive 912, or communications interface 924.

Although the various embodiments of the devices have been described herein in connection with certain disclosed embodiments, many modifications and variations to those embodiments may be implemented. For example, different types of communication schemes and devices may be employed. Also, where materials are disclosed for certain components, other materials may be used. The foregoing description and following claims are intended to cover all such modification and variations. The foregoing written description enables one of ordinary skill to make and use what is considered presently to be the best mode thereof, those of ordinary skill will understand and appreciate the existence of variations, combinations, and equivalents of the specific embodiment, method, and examples herein. The present disclosure should therefore not be limited by the above described embodiment, method, and examples, but by all embodiments and methods within the scope and spirit of the present disclosure as claimed.

Any patent, publication, or other disclosure material, in whole or in part, said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, said to be incorporated by reference herein, but which conflicts with existing definitions, statements, or other disclosure material set forth herein will only be incorporated to the extent that no conflict arises between that incorporated material and the existing disclosure material.

What is claimed is:

1. A unitary displacement sensor comprising:
   a circuit;
   an accelerometer coupled to the circuit, the accelerometer configured to measure an acceleration of the unitary displacement sensor;
   a magnetometer coupled to the circuit;
   a wireless communications module coupled to the circuit; and
   a power source coupled to the circuit, the accelerometer, the second device, and wireless communications module; and
   wherein the circuit is configured to selectively apply power to both the wireless communications module and the magnetometer only when a level of acceleration measured by the accelerometer meets or exceeds a predefined threshold level of acceleration; and
   wherein the wireless communications module is configured to transmit data regarding a measurement by the magnetometer of the magnetic field.

2. The unitary displacement sensor of claim 1, wherein the unitary displacement sensor is sized and configured to be mounted at an entry point to a location.

3. The unitary displacement sensor of claim 1, wherein the wireless communications module is a W-Fi embedded microchip.

4. The unitary displacement sensor of claim 1, wherein the circuit comprises a processor to determine whether a predefined threshold level of change in the magnetic field is met or exceeded and whether the predefined threshold level of acceleration is met or exceeded.

5. The unitary displacement sensor of claim 4, wherein the processor is configured to determine at least one of a time that the predefined threshold level of change in the magnetic field is met or exceeded or a time that the predefined threshold level of acceleration is met or exceeded.

6. The unitary displacement sensor of claim 5, wherein the wireless communications module is configured to transmit an information signal that comprises at least one of data regarding the time that the predefined threshold level of change in the magnetic field is met or exceeded or data regarding the time that the predefined threshold level of acceleration is met or exceeded.

7. The unitary displacement sensor of claim 5, further comprising a non-transitory computer readable medium, wherein at least one of data regarding the time that the predefined threshold level of change in the magnetic field is met or exceeded or data regarding the time that the predefined threshold level of acceleration is met or exceeded is stored in the non-transitory computer readable medium.

8. The unitary displacement sensor of claim 1, wherein the circuit is configured to determine the level of acceleration measured by the accelerometer.

9. The unitary displacement sensor of claim 8, wherein the circuit is configured to determine the level of change in the magnetic field measured by the magnetometer.

10. The unitary displacement sensor of claim 9, wherein the circuit is configured to provide data regarding the level of acceleration measured the accelerometer and data regarding the level of change in the magnetic field measured by the magnetometer to the wireless communications module, and the wireless communications module is configured to transmit the data regarding the level of acceleration measured by the accelerometer and the data regarding the level of change in the magnetic field measured by the magnetometer.

11. The unitary displacement sensor of claim 9, further comprising a non-transitory computer readable medium coupled to the circuit, wherein the non-transitory computer readable medium is configured to store the data regarding the level of acceleration measured by the accelerometer and the data regarding the level of change in the magnetic field measured by the magnetometer.

12. The unitary displacement sensor of claim 1, wherein the wireless communications module is configured to receive a standby signal, and wherein the wireless communications module is configured not transmit the alarm signal for a period of time when the standby signal is received by the wireless communications module.

13. The unitary displacement sensor of claim 1, wherein the circuit is configured to enable the wireless communications module to transmit the data when a level of change in the magnetic field measured by the magnetometer meets or exceeds a predefined threshold level of change of the magnetic field.

14. The unitary displacement sensor of claim 1, wherein the magnetometer is configured to measure a magnetic field of a ferrous object adjacent to the unitary displacement sensor.

15. The unitary displacement sensor of claim 1, wherein the circuit comprises a switch coupling the power source to the magnetometer and the wireless communications module to apply power thereto when closed, the switch configured to close when the acceleration measured by the accelerometer meets or exceeds a predefined threshold level of acceleration.

16. A system for sensing displacement, comprising:
    a displacement sensor comprising:
       a circuit;
       an accelerometer coupled to the circuit the accelerometer configured to measure an acceleration of the unitary displacement sensor;
       a magnetometer coupled to the circuit;
       a wireless communications module coupled to the circuit; and
       a power source coupled to the circuit, the accelerometer, the magnetometer, and wireless communications module; and
       wherein the circuit is configured to selectively apply power to both the wireless communications module and the magnetometer only when a level of acceleration measured by the accelerometer meets or exceeds a predefined threshold level of acceleration; and wherein the wireless communications module is configured to transmit data regarding a measurement by the magnetometer of the magnetic field; and an access node configured to receive data from the displacement sensor regarding a measurement of a magnetic field measured by the displacement sensor;

wherein the access node is configured to receive the data from the displacement sensor, and wherein the access node receives the data from the displacement sensor when a predefined threshold level of acceleration of the displacement sensor is met or exceeded; and wherein the access node is configured to transmit the data regarding the measurement of the magnetic field to a monitoring and control system.

17. The system of claim 16, further comprising:
a processor; and
an alarm device coupled to the processor, the alarm device configured to emit an audible sound; and
wherein the processor is configured to enable the alarm device to emit the audible sound upon receipt of a signal from the processor.

18. A method for detecting displacement of a sensor, comprising:
measuring a level of acceleration of the sensor;
comparing the measured level of acceleration to a predefined threshold level of acceleration;
selectively applying power to both a wireless communications module and a magnetometer only when the predefined threshold level of acceleration is met or exceeded;
transmitting a signal when the predefined threshold level of acceleration is met or exceeded;
wherein the signal comprises data regarding a measurement of a magnetic field from the magnetometer.

19. The method of claim 18, further comprising:
measuring a level of change in the magnetic field;
comparing the measured level of change in the magnetic field to a predefined threshold level of change of the magnetic field.

20. The method of claim 18, further comprising:
obtaining a reference magnetic field measurement for the sensor; and
wherein obtaining the reference magnetic field measurement comprises measuring a magnetic field of the sensor when the sensor is at a first location, the first location defined such that the sensor is in proximity to a ferrous element, and the ferrous element being a component of infrastructure at which the sensor is installed.

21. The method of claim 18, further comprising transmitting a notice of an intrusion to at least one of a user or a security circle of a user based on receiving the signal.

* * * * *